United States Patent
Shikii et al.

(10) Patent No.: US 8,416,363 B2
(45) Date of Patent: Apr. 9, 2013

(54) LIQUID CRYSTAL DISPLAY BACKLIGHT DEVICE AND LIQUID CRYSTAL DISPLAY

(75) Inventors: Shinichi Shikii, Nara (JP); Tetsuro Mizushima, Osaka (JP); Tatsuo Itoh, Osaka (JP); Akira Kurozuka, Osaka (JP); Takayuki Nagata, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/669,297

(22) PCT Filed: Jul. 15, 2008

(86) PCT No.: PCT/JP2008/001902
§ 371 (c)(1),
(2), (4) Date: Jan. 15, 2010

(87) PCT Pub. No.: WO2009/011122
PCT Pub. Date: Jan. 22, 2009

(65) Prior Publication Data
US 2010/0195022 A1    Aug. 5, 2010

(30) Foreign Application Priority Data
Jul. 17, 2007   (JP) .................. 2007-185792

(51) Int. Cl.
*G02F 1/1335*    (2006.01)
(52) U.S. Cl. ............ 349/62; 349/65; 362/97.2; 362/626
(58) Field of Classification Search .............. 349/62, 349/65, 67; 362/97.1, 97.2, 607, 611, 626
See application file for complete search history.

(56) References Cited

U.S. PATENT DOCUMENTS

| 6,167,182 A | 12/2000 | Shinohara et al. |
| 6,575,584 B1 * | 6/2003 | Habraken ..................... 362/609 |
| 2010/0220261 A1 * | 9/2010 | Mizushima et al. ........... 349/64 |

FOREIGN PATENT DOCUMENTS

| JP | 2002-169480 | 6/2002 |
| JP | 2004-146269 | 5/2004 |
| JP | 2006-202703 | 8/2006 |
| JP | 2007-42319 | 2/2007 |
| WO | 98/19105 | 5/1998 |
| WO | WO 2007074787 A1 * | 7/2007 |

OTHER PUBLICATIONS

International Search Report issued Oct. 14, 2008 in International (PCT) Application No. PCT/JP2008/001902.

* cited by examiner

*Primary Examiner* — Michael Caley
(74) *Attorney, Agent, or Firm* — Wenderoth, Lind & Ponack, L.L.P.

(57) ABSTRACT

It is aimed to provide an LCD backlight device and liquid crystal display that can suppress light quantity loss and ensure uniform brightness.
An LCD backlight device 101 has a laser light source 1 that emits laser light, and a light guiding plate 3 that transforms the laser light from the laser light source 1 into linear laser light, and transforms the linear laser light into a planar laser light, and emits the planar laser light, and the light guiding plate 3 has a third side face 6 that transforms the linear laser light into the planar laser light by reflecting the linear laser light by a plurality of reflection surfaces that are formed along the entrance direction of the linear laser light.

29 Claims, 23 Drawing Sheets

LIQUID CRYSTAL DISPLAY BACKLIGHT DEVICE AND LIQUID CRYSTAL DISPLAY

TECHNICAL FIELD

The present invention relates to an LCD (liquid crystal display) backlight device using three color light sources, which are R (red), G (green) and B (blue), and a liquid display device using this LCD backlight device.

BACKGROUND ART

Display devices have an emission type display device that can self-emit, such as an organic emission display device and plasma display device, but a light receiving type display device, that cannot self-emit and requires another light source, such as a liquid crystal display device.

A general liquid crystal display device has two display panels having electric field generation electrodes and a liquid crystal layer having dielectric constant anisotropy. In such a liquid crystal display device, an electric field is generated in the liquid crystal layer by applying voltage to the electric field generation electrodes, and the intensity of this electric field is adjusted by changing the voltage so as to generate light valve, and a desired image is obtained by adjusting the transmittance of light that passes through the liquid crystal layer. The light to be used for this purpose is normally light from an artificial backlight light source, which is equipped separately.

For the backlight light source used for a liquid crystal display device, a fluorescent lamp, such as a cold cathode fluorescent lamp (CCFL), is often used as a light source that irradiates light from the rear face of the liquid crystal panel onto the entire liquid crystal panel evenly. Generally known backlight light sources are an edge light type backlight light source which irradiates onto the liquid crystal panel from the rear face side using nearly uniform light, that is a CCFL light which enters from the side face of a light guiding plate and is emitted from the front face of the light guiding plate, or a direct type backlight light source which has several CCFLs arrayed on the rear face of the liquid crystal panel, and which irradiates onto the liquid crystal panel via a diffusion plate.

Recently the development of image display devices using light emitting diodes (LED) and lasers as light sources, that do not use mercury and conserves power consumption, is ongoing, addressing environmental problems and energy saving issues. Laser in particular is an optimum light source for image display devices, because not only is power consumption low, but in terms of image quality, includes a wide color reproduction range.

On the other hand, a light box and light guiding plate are normally used to simplify liquid crystal TVs and to make the construction slim thereof. As a backlight device using this light box and light guiding plate, the configurations disclosed in Patent Literature 1 and Patent Literature 2 have been proposed.

Patent Literature 1, for example, proposes a system which allows laser lights to enter the light box by linearly reflecting laser light using a hologram mirror, based on mono-chromaticity, polarization and rectilinear propagation characteristics of laser light, and irradiates two-dimensionally via a half mirror array. Patent Literature 2 proposes a system which has arrayed light sources on the left and right of a light guiding plate, and irradiates light two-dimensionally via a triangular groove formed at the bottom face of the light guiding plate. An advantage of these systems is that if laser light, of which polarizing directions are the same, are used for the light source, a backlight with high light utilization efficiency can be constructed by maintaining polarization, compared with the case of non-polarization.

However in the case of a system where laser light are reflected using a hologram mirror, as disclosed in Patent Literature 1, if three colors: R (red), G (green) and B (blue) are used as the laser light source, the reflection direction by the hologram mirror is different depending on the color, which may generate uneven color in the distribution of light finally emitted from the light guiding plate. Also the light quantity distribution of laser light reflected by the plane hologram mirror reflects the profile of the laser light. For example, if the laser light has a Gaussian profile light quantity distribution, the brightness in the center area of the light guiding plate increases, which means that only uneven brightness can be implemented, which is not acceptable.

Generally the reflectance of a hologram mirror has poor diffraction efficiency depending on the wavelength, and generates a light quantity loss. Furthermore the half mirrors are used for the configuration to two-dimensionally reflect the laser light, which means that the reflectance errors of half mirrors are reflected in the brightness distribution. The light quantity distribution of the light source is also an influence on the distribution of the laser lights reflected by each half mirror, and uneven brightness is generated in the light source profile with the pitch of the half mirrors. In order to irradiate a large area panel with slim construction, many half mirrors, of which respective transmittance characteristics have subtle differences, are required, which makes manufacturing very difficult and increases cost, and generates many other problems, so it is therefore very impractical.

In the case of the system in which light sources are disposed in arrays on the side faces of the light guiding plate, as disclosed in Patent Literature 2 as well, the profiles of the light sources are directly reflected within the light guiding plate, and uneven brightness, when the profiles of the plurality of light sources are combined, is generated. Also in the case of using a laser for the light source of Patent Literature 2, the laser light that entered the light guiding plate directly reaches the side face of the light guiding plate at the opposite side of the side face where the laser light entered, because of the rectilinear characteristics thereof, and is transmitted through this side face, which generates loss. Even if this light is reflected using a reflection element or the like, the laser light that propagates horizontally continuously propagates for a long distance while being reflected, and generates light quantity loss due to the absorption of the light guiding plate. If the laser light spreads and enters the entrance of the light guiding plate, brightness around the entrance increases and generates uneven brightness, so this system also has many problems.

Patent Literature 1: Japanese Patent Application Laid-Open No. 2002-169480
Patent Literature 2: Japanese Patent Application Laid-Open No. 2006-202703

SUMMARY OF THE INVENTION

With the foregoing in view, it is an object of the present invention to provide a liquid crystal display backlight device and liquid crystal display that can suppress the light quantity loss and ensure uniformity of brightness.

A liquid crystal display backlight device according to an aspect of the present invention has: a laser light source that emits laser light; and a light guiding unit that transforms the laser light from the laser light source into a linear laser light, and transforms the linear laser light into a planar laser light, and emits the light, and the light guiding unit includes a light guiding plate that has a planar reflection surface for transforming the linear laser light into the planar laser light by reflecting the linear laser light by a plurality of reflection surfaces that are formed along the entrance direction of the linear laser light.

A liquid crystal display according to another aspect of the present invention has the above mentioned liquid crystal display backlight device, and a two-dimensional spatial modulation element that two-dimensionally modulates the light intensity of light irradiated by this liquid crystal display backlight device.

According to the present invention, the laser light is transformed into planar laser light by reflecting the linear laser light by the planar reflection surface disposed on the light guiding plate, therefore light quantity loss can be suppressed, and brightness can be uniform.

The objects, features and advantages of the present invention will become more apparent from the following detailed description and accompanying drawings.

DETAILED DESCRIPTION OF THE INVENTION

Embodiments of the present invention will now be described with reference to the accompanying drawings. The following embodiments are examples embodying the present invention, and to not limit the technical scope of the present invention.

Embodiment 1

Figure 1:
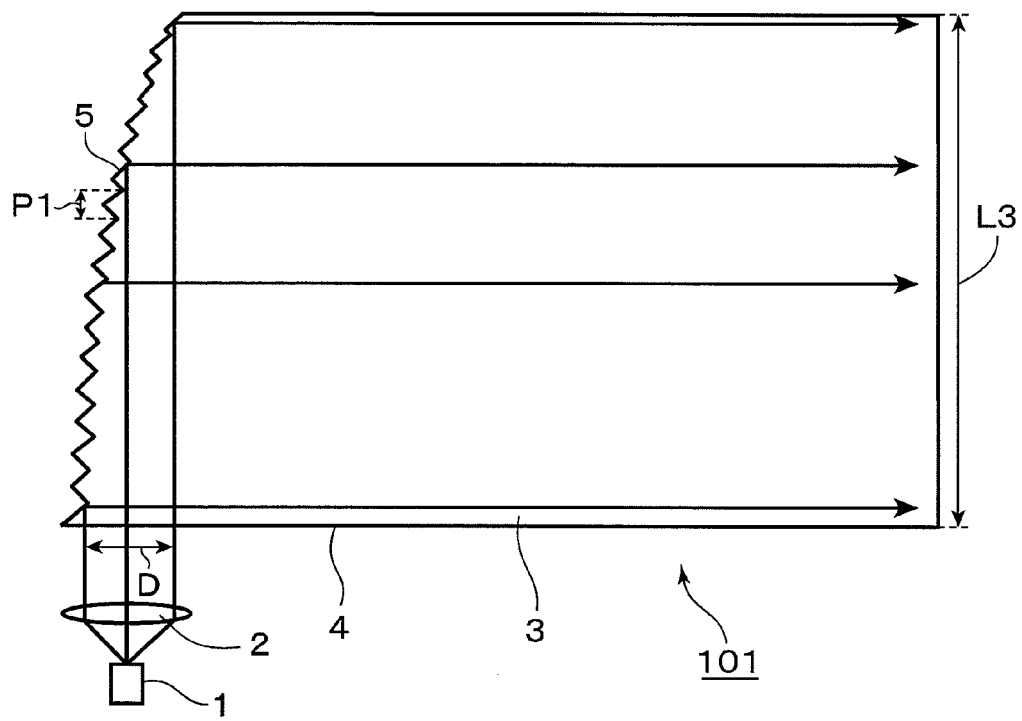
FIG. 1 is a front view depicting a configuration of the LCD backlight device according to Embodiment 1 of the present invention.
Figure 2:
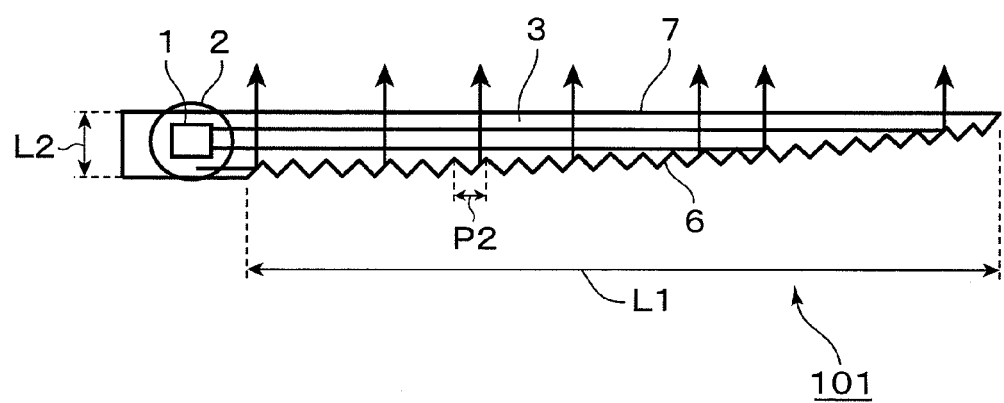
FIG. 2 is a side view depicting a configuration of the LCD backlight device according to Embodiment 1 of the present invention.

FIG. 1 is a front view depicting a configuration of an LCD backlight device according to Embodiment 1 of the present invention, and FIG. 2 is a side view depicting a configuration of the LCD backlight device according to Embodiment 1 of the present invention. FIG. 2 is a diagram depicting the LCD backlight device viewed from the laser light source side as shown in FIG. 1. The LCD backlight device 101 according to Embodiment 1 is comprised of only three components: that is a laser light source 1, a collimator lens 2 and a light guiding plate 3.

The operation of the LCD backlight device 101 according to Embodiment 1 will now be described. Laser light emitted from the laser light source 1 is transformed into approximately parallel light by the collimator lens 2. The laser light transformed into approximately parallel light enters into the light guiding plate 3 via a first side face 4 of the light guiding plate 3. The laser light enters into the light guiding plate 3 from the edge of the first side face 4 of the light guiding plate 3. The laser light entered into the light guiding plate 3 reach a second side face 5 that is adjacent to the first side face 4. A triangular prism array is constructed in the second side face 5 on a predetermined curve.

Figure 3:
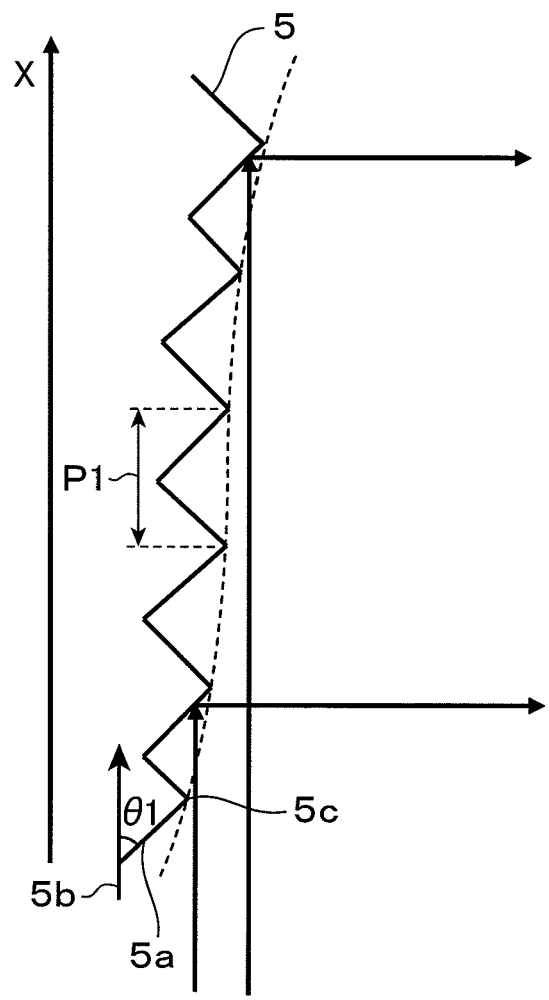
FIG. 3 is an enlarged view of a part of the second side face of the light guiding plate of the LCD backlight device according to Embodiment 1 of the present invention.

FIG. 3 is an enlarged view of a part of the second side face 5 of the light guiding plate 3 of the LCD backlight device 101 according to Embodiment 1 of the present invention. P1 denotes a pitch of the triangular prism array, and θ1 denotes an angle formed by an inclined surface 5a of each triangular prism in the first side face 4 side and the optical axis direction 5b. If angle θ1 is 45°, then the laser light that reaches each triangular prism is reflected at a 90° angle in each inclined surface of the reached triangular prism respectively, and is transformed into linear laser light. A position of a vertex 5c of each triangular prism is expressed by a line of a polynomial (1) of degree 2 or more, according to the profile of the laser light source to be used, where an origin is the vertex of the triangular prism closest to the intersection of the first side face 4 and the second side face 5. In other words, the sequence of points connecting the vertex 5c of each triangular prism in the light guiding plate 3 side constituting the triangular prism array in the second side face 5 side is expressed by the polynomial of degree 2 or more shown in the following Expression (1).

$$\sum_{n=0}^{n\geq 2} An \times X^n \quad (1)$$

Here n denotes a degree of the polynomial, An denotes a coefficient of each degree, and the X axis is a traveling direction of the laser light when the origin is the intersection of the first side face 4 and the second side face 5. By inputting an appropriate numerical value, depending on the profile of the light source, into the coefficient of An of the polynomial, the profile of the laser light, which is reflected by the triangular prism and transformed into a linear laser light, can be approximately uniform.

Generally in the case of a linear expression with n=1, the second side face 5 is not a curved surface but is a straight line. In order to transform the laser light to be a uniform linear laser light, the laser light that enters the first side face 4 must have a uniform top hat profile. However it is difficult to obtain an ideal top hat profile, and a laser light which travels a certain distance has a profile of which both ends have a gentle inclination due to diffraction, and cannot maintain an ideal top hat profile. Therefore the cross-sectional profile of the second side face 5, that is a profile of the line connecting the vertex of each triangular prism of the second side face 5, cannot be sufficiently implemented by a linear expression, and requires a polynomial of degree 2 or more.

The laser light which is totally reflected by the second side face 5 propagate in the light guiding plate 3 approximately parallel with the longitudinal direction, while a part are totally reflected by the light guiding plate surface 7, then are totally reflected by the third side face 6 that is adjacent to the first side face 4 and the second side face 5, and are emitted from the light guiding plate surface 7 roughly vertically. In the third side face 6 as well, a triangular prism array is formed on a predetermined curve from a predetermined position.

Figure 4:
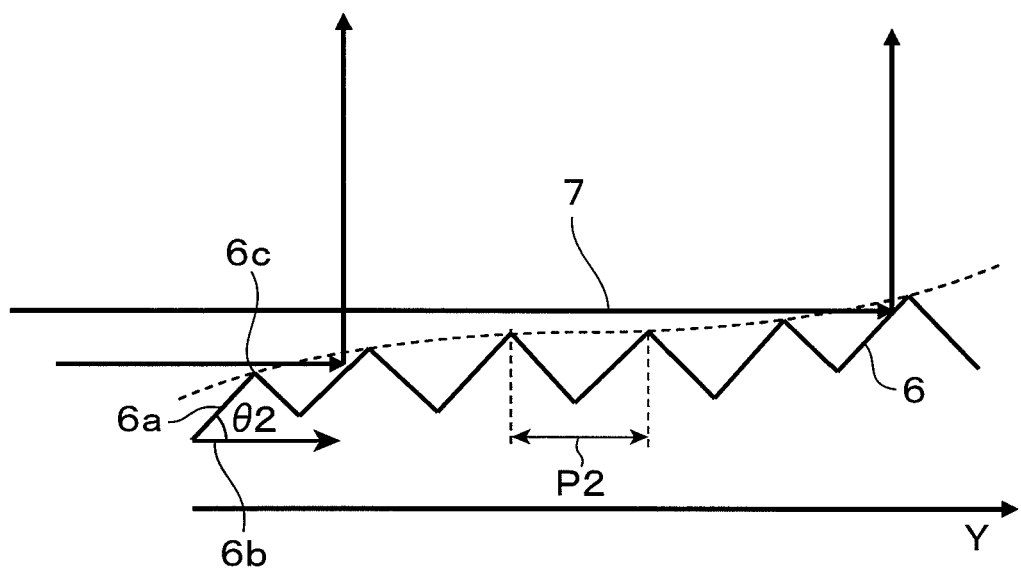
FIG. 4 is an enlarged view of a part of the third side face of the light guiding plate of the LCD backlight device according to Embodiment 1 of the present invention.

FIG. 4 is an enlarged view of a part of the third side face 6 of the light guiding plate 3 of the LCD backlight 101 according to Embodiment 1 of the present invention. P2 denotes a pitch of the triangular prism array, and θ2 denotes an angle formed by an inclined surface 6a of each triangular prism in the second side face 5 side and the optical axis direction 6b. If angle θ2 is 45°, then the laser light that reaches each triangular prism are reflected at a 90° angle in each inclined surface of the reached triangular prism respectively, and are transformed into planar laser light. A position of a vertex 6c of each triangular prism is expressed by a line of a polynomial (2) of degree 2 or more, where an origin is the vertex of the triangular prism closest to the second side face 5 in the third side face 6, so that the laser light is emitted uniformly from the light guiding plate surface 7. In other words, the sequence of points connecting the vertex 6c of each triangular prism in the light guiding plate 3 side constituting the triangular prism array in the third side face 6 is expressed by the polynomial of degree 2 or more shown in the following Expression (2).

$$\sum_{n=0}^{n\geq 2} Bn \times Y^n \quad (2)$$

Here n denotes a degree of the polynomial, Bn denotes a coefficient of each degree, and the Y axis is a traveling direction of the laser light when the origin in the vertex of the triangular prism closest to the second side face 5 in the third side face 6. By inputting an appropriate numerical value, depending on the profile of the light source, into the coefficient Bn of the polynomial, the profile of the laser light, which is reflected by the triangular prism and transformed into a planar laser light, can be approximately uniform. The cross-sectional profile of the third side face 6, that is a profile of the line connecting the vertex of each triangular prism of the second side face 5, also requires a polynomial of degree 2 or more, for the same reason as the cross-sectional profile of the second side face 5.

The linear laser light refers to a laser light which was emitted from a light source and was then expanded up to either the vertical or horizontal size of the two-dimensional area to be illuminated, and a planar laser light refers to a laser light which was expanded linearly and was then further expanded in a predetermined direction, up to a two-dimensional area to be illuminated.

In the present embodiment, the third side face 6 corresponds to an example of the planar reflection surface, the light guiding plate surface 7 corresponds to an example of the emission surface of the light guiding plate, the first side face 4 corresponds to an example of the entrance surface of the light guiding plate, and the second side surface 5 corresponds to an example of the linear reflection surface of the light guiding plate.

In the present embodiment, the light guiding plate 3 corresponds to an example of a light guiding unit. The light guiding plate 3 has the first side face 4 (entrance surface) where laser light enters, the second side face 5 (linear reflection surface) which is adjacent to the first side face 4 and transforms the laser light which entered from the first side face 4 into linear laser light by reflecting the laser light, the third side face 6 (planar reflection surface) which is adjacent to the first side face 4 and the second side face 5, and transforms the linear laser light transformed by the second side face 5 into planar laser light by reflecting the linear laser light using a plurality of reflection surfaces, and the light guiding plate surface 7 (emission surface) that emits the planar laser light transformed by the third side face 6.

If a semiconductor laser is used, for example, as the laser light source 1, the polarization direction of the laser light emitted from the laser light source 1 are aligned. However if a fiber light source, which guides the laser light emitted from a distant light source via a fiber, is used for the laser light source 1, then the polarization direction of the laser light which are emitted from the fiber become random.

Figure 5:
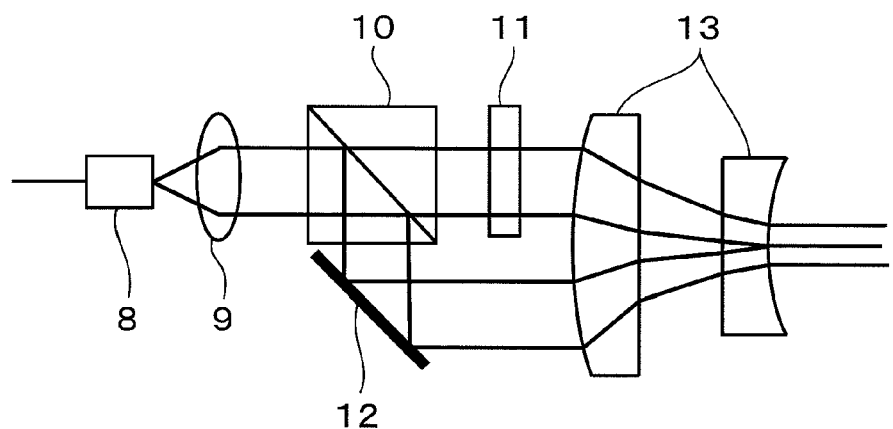
FIG. 5 is a diagram depicting an example of using a fiber light source for the LCD backlight device according to Embodiment 1 of the present invention.

FIG. 5 is a diagram depicting an example of using a fiber light source for the LCD backlight device according to Embodiment 1 of the present invention. In this case, as FIG. 5 shows, the LCD backlight device has a fiber light source 8, collimator lens 9, polarized bean splitter 10, ½ wavelength plate 11, mirror 12 and reducer 13, for example, instead of the laser light source 1 and the collimator lens 2 shown in FIG. 1.

The laser light emitted from the fiber light source 8 is transformed into approximately parallel light by the collimator lens 9, and are separated into P polarized light and S polarized light by the polarized beam splitter (PBS) 10. The polarized beam splitter 10 reflects the S polarization component of the entered laser light, and transmits the P polarization component. Then the S polarization component reflected by the polarized beam splitter 10 is reflected by the mirror 12, and the polarization direction of the P polarization component transmitted through the polarized beam splitter 10 is rotated 90° by the ½ wavelength plate 11. After aligning the polarization directions of the separated laser light, the beam diameter is reduced by the reducer 13. Thereby approximately parallel laser light, of which polarization direction is aligned, can be obtained even if the fiber light source is used for the light source.

Effects of using the LCD backlight device 101 according to Embodiment 1 are as follows. First the number of composing elements is small, therefore light utilization efficiency is high and cost is low. The minimum number of composing elements is three: that is the laser light source 1, collimator lens 2 and light guiding plate 3. Since the laser light source is used for the light source and the second side face 5 of the light guiding plate 3 has a linear reflection function, the hologram mirror disclosed in Patent Literature 1 is not required even if a single light source is used, therefore the light utilization efficiency is high, and the device can be constructed with low cost.

If the hologram mirror disclosed in Patent Literature 1 is used for a reflector, light quantity loss is generated because of the diffraction efficiency in the hologram mirror. However according to Embodiment 1, the light quantity loss is generated only in surface reflection in the entrance to the light guiding plate 3 (first side face 4) and in the exit thereof (light guiding plate surface 7), and in the absorption inside the light guiding plate 3, and this loss is dramatically smaller than the reflection loss in the hologram mirror and transmission loss in each half mirror in the case of Patent Literature 1.

Among the systems that use a light guiding plate, the system in Embodiment 1 is one of the systems that generates the least light quantity loss, that is only surface reflection at the entrance and exit of the light guiding plate and in the absorption in the light guiding plate. Light quantity loss due to the surface reflection is normally about 3.5% in each surface, and this can be decreased to about 1% by performing coating on a surface. For the light quantity loss due to internal absorption, multiple reflection in the light guiding plate is essentially not generated because a laser that has rectilinear propagation characteristics is used for the light source and the light is entered approximately parallel, and even if the lasers propagate the maximum distance, the propagation distance is the sum of the long side and short side of the light guiding plate surface 7. Hence Embodiment 1 implements a system of which light quantity loss, due to internal absorption, is minimum.

Furthermore according to Embodiment 1, the laser light basically reflects only 90° from their entrance to the light guiding plate 3 from the first side face 4 to their emit from the light guiding plate surface 7, so if laser light, of which polarizing direction is aligned, is used for the light source, the laser light is emitted from the light guiding plate surface 7 while maintaining the polarizing direction. Hence a system of which light quantity loss in the liquid crystal panel is extremely low, and light utilization efficiency is high, is implemented.

The second effect is that when the light source emits approximately parallel light, and has an ordinary Gaussian profile, uniform two-dimensional brightness distribution can be implemented while maintaining a high light utilization efficiency if appropriate values are specified for the coefficient An and coefficient Bn in the above mentioned Expression (1) and Expression (2). Normally in order to make two-dimensional brightness distribution uniform, a plurality of half mirrors are used, as in the case of Patent Literature 1, or random reflection is generated in the light guiding plate as in the case of Patent Literature 2.

If a plurality of half mirrors are used, as in the case of Patent Literature 1, the light quantity distribution of the light source is directly reflected on the light quantity distribution of laser light reflected by each half mirror, and uneven color is generated in the light source profile with the same pitch as the half mirrors. If random reflection is generated in the light guiding plate, as in the case of Patent Literature 2, the two-dimensional brightness distribution becomes uniform as a result, but if laser light is used for the light source, then the laser light that entered the light guiding plate directly reaches and transmits through the side face of the light guide plate opposite of the entrance side, because of the rectilinear propagation characteristic of laser light, therefore loss is generated. Even if the laser light is reflected using a reflection element, the laser light that propagates horizontally continue propagating for a long distance in the reflected state, and the internal absorption of the light guiding plate causes a major light quantity loss.

According to Embodiment 1, the light being guided in the light guiding plate is sequentially reflected from the edge, to make brightness uniform, so uneven light quantity according to the light source profile is not generated in theory, and light that reaches the edge of the light guiding plate is not reflected many times, hence a system with minimum absorption loss can be implemented. In other words, the present Embodiment 1 has a major feature in that light quantity loss can be minimized while actively securing uniform brightness.

The third effect is that image quality is high because uneven color is not generated very much. In Patent Literature 1, which uses hologram mirrors, if each color: R (red), G (green) and B (blue) are used for the light source, uneven color may be generated because the diffraction angle is different depending on the R, G or B color. According to Embodiment 1, on the other hand, only the collimator lens 2 deflects light, and the lenses disposed after the collimator lens 2 all reflect light or allow light to enter vertically, therefore wavelength dependency hardly exists, and an optical system with very little uneven color can be constructed.

Needless to say, the LCD backlight device can be very slim since a light guiding plate is used.

The array shapes of the triangular prism on the second side face 5 and the third side face 6 are specified with respect to the coordinates of the vertex, but may be specified with respect to one of the base angles at both ends of the base, instead of the vertex of the triangular prism. An expression in this case can be specified in the same manner as the above mentioned Expression (1) and Expression (2).

According to Embodiment 1, the prism of the prism array on the second side face 5 and the third side face 6 was described as a triangular prism, but the same effect is implemented if a trapezoidal prism is used instead, for which redundant description is omitted. This is the same for the following description using a triangular prism.

Figure 6:
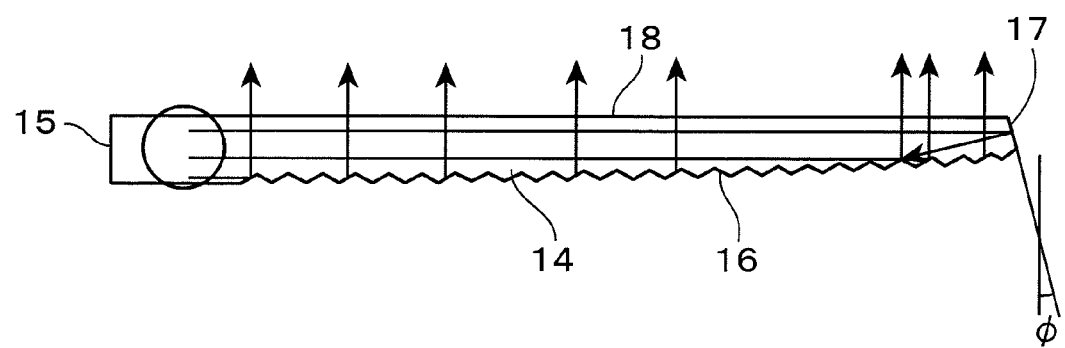
FIG. 6 is a cross-sectional view depicting the light guiding plate of the LCD backlight device according to a variant form of Embodiment 1 of the present invention.

Another form of the light guiding plate according to Embodiment 1 will now be described. FIG. 6 is a cross-sectional view of a light guiding plate of the LCD backlight device according to a variant form of Embodiment 1 of the present invention. According to the light guiding plate 14 shown in FIG. 6, the optical paths are the same as the light guiding plate 3 shown in FIG. 1 in the second side face 15 of the light guiding plate 14, but in the case of the light guiding plate 14, a part of the laser light reflected on the second side face 15 is reflected by the third side face 16, and the rest of the laser light reaches the fourth side face 17. The fourth side face 17 is inclined downward by angle φ, and is coated so as to reflect the laser light. Thereby the laser light which reached the fourth side face 17 can be reflected toward the third side face 16, and the laser light which was reflected by the fourth side face 17 and reached the third side face 16 are totally reflected by the inclined surface in the fourth side face 17 side in the third side face 16, and can be emitted from the light guiding plate surface 18. The fourth side face 17 of this variant form of the present embodiment corresponds to an example of the reflection surface of the light guiding plate.

Figure 7:
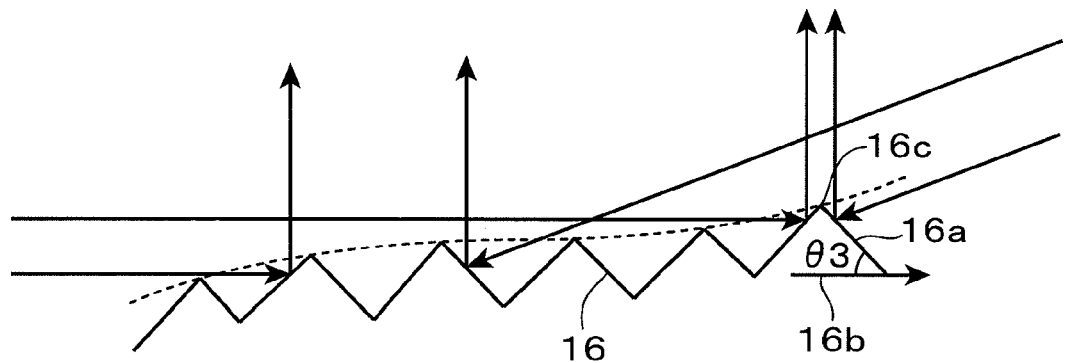
FIG. 7 is an enlarged view depicting a part of the third side face of the light guiding plate of the LCD backlight device according to a variant form of Embodiment 1 of the present invention.

FIG. 7 is an enlarged view of a part of the third side face 16 of the light guiding plate 14 of the LCD backlight device according to a variant form of Embodiment 1 of the present invention. In FIG. 7, θ3 is an angle formed by the inclined surface 16a in the fourth side face 17 side of each triangular prism in the third side face 16, and the optical axis direction 16b.

In this case, as FIG. 7 shows, the laser light can be emitted approximately vertically from the light guiding plate surface 18 by setting the angle θ3 in the fourth side face 17 side in the third side face 16 to (45−φ) degrees, where φ denotes an inclination angle of the fourth side face 17 (angle formed by the fourth side face 17 and the plane vertical to the optical axis). If the inclination angle φ is too large, the total reflection conditions may not be satisfied in the third side face 16, so the inclination angle φ must be selected under conditions that satisfy the total reflection conditions. The laser light may be reflected by forming a reflection coat on the surface of the third side face 16. The position of the vertex 16c of each triangular prism is expressed by a polynomial of degree 2 or more, shown in the above mentioned Expression (2), and if the coefficient Bn of the polynomial, is determined considering the amount of the reflected light from the fourth side face 17, uniform two-dimensional brightness distribution can be obtained, as mentioned above.

An advantage of this configuration is that the processing of the light guiding plate 14 becomes even simpler. When the light guiding plate is molded by injection molding, the dispersion of thickness in the plane is small, and no extremely thin area is created, so processing is simple and manufacturing cost can be decreased. By inclining the fourth side face 17 so that a part thereof can reflect as seen in the light guiding plate 14, and by optimizing the form of the third side face 16, light quantity loss due to a leak of laser light, which is caused by laser light returning to the second side face 15 side of the light guiding plate 14, can be prevented, and two-dimensional brightness distribution can be maintained to be uniform with certainty.

In FIG. 6, the fourth side face 17 is inclined downward toward the third side face 16, but may be inclined upward toward the light guiding plate surface 18. In this case, the laser light reflected by the fourth side face 17 is totally reflected by the light guiding plate surface 18 and eventually reaches the third side face 16, and is reflected by the third side face 16, so as to be emitted from the light guiding plate surface 18. At this time, if the inclination angle φ of the fourth side face 17 is a negative value, and if the angle θ3 in the fourth side face 17 of the triangular prism of the third side face 16 is (45+φ) degrees, then the laser light can be emitted from the light guiding plate surface 18 approximately vertically.

In this case, the position of the vertex of the triangular prism is expressed by a polynomial of degree 2 or more, shown in the above mentioned Expression (2), and if the coefficient Bn of the polynomial is determined considering the amount of reflected light from the fourth side face 17, as mentioned above, then uniform two-dimensional brightness distribution can be obtained, just like the above mentioned case. Furthermore, if the fourth side face 17 is inclined upward toward the light guiding plate surface 18, the inclination of the fourth side face 17 can also be a draft for injection molding, therefore the light guiding plate 14 can be molded very easily, and cost can be kept low.

Figure 8:
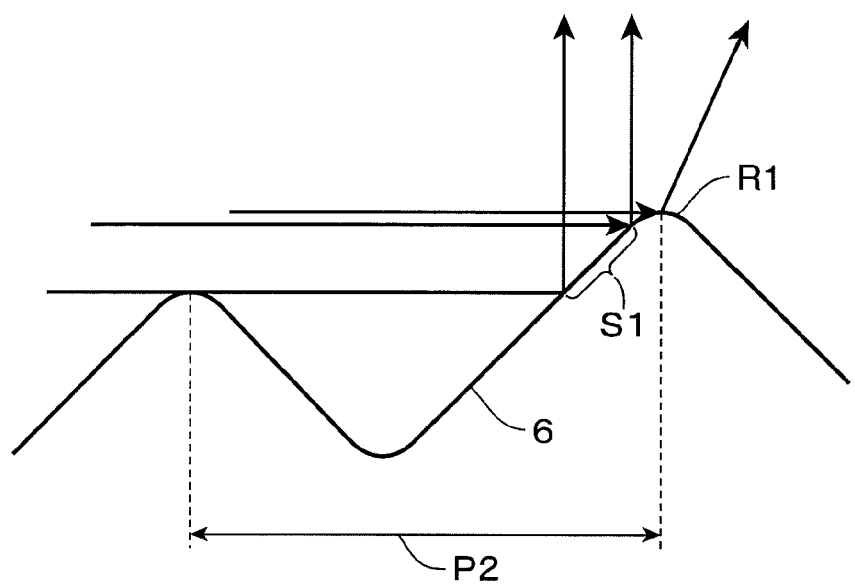
FIG. 8 is a view further enlarging the third side face of the light guiding plate of the LCD backlight device according to Embodiment 1 of the present invention.

Now the pitch of the triangular prism array constituting the third side face 6 according to Embodiment 1 will be described in detail. FIG. 8 is a diagram further enlarging the third side face 6 of the light guiding plate 3 of the LCD backlight device 101 according to Embodiment 1 of the present invention.

Generally when a resin product is manufactured by molding, a metal die for transferring a desired form is manufactured first. To manufacture a triangular prism form, shown in FIG. 8, using a die, the vertex of the triangular prism is formed by grinding the die using a pointed diamond tool or the like. The pointed diamond tool, however, still has a sub-micron level of curvature, and while griding over a long distance, the tip of the diamond tool becomes rounded, reaching a several micron level. This means that the form of the transferred resin also has several microns of curvature, and in concrete terms, the curvature R1 shown in FIG. 8 has several microns of curvature. If a laser light is irradiated, the laser light cannot be reflected up vertically, but is reflected in a direction inclined in the light traveling direction.

If the pitch P2 of the triangular prism array, between adjacent triangular prisms for reflecting the approximately parallel laser light up vertically using the inclined surfaces of the triangular prisms, is small, the area S1 where laser lights are vertically reflected by each prism becomes small, and components that are totally and vertically reflected decrease. Therefore the pitch P2 should be as wide as possible.

In concrete terms, the pitch P2 of the triangular prism array should be (0.01×L1/L2) mm or more, where L1 (mm) denotes a length in the propagation direction of the laser light that is reflected by the second side face 5 in the planar illuminated area in the third side face 6 of the light guiding plate 3, and L2 (mm) is a length of the ridge between the first side face 4 and the second side face 5 of the light guiding plate 3, that is the length of the first side face 4 or second side face 5 in the short side direction (see FIG. 2). In this case, the ratio of the reflected light at the vertex of the triangular prism can be decreased to be negligibly small, so a light guiding plate with higher light utilization efficiency can be implemented. For example, when L1=700 mm and L2=10 mm, a 0.7 mm or more is required for the pitch P2 of the triangular prism array. In this case, the ratio of the light reflected vertically by the third side face 6 is 97% or more of all the light, so the loss of light utilization efficiency can be confined to a negligible range.

Figure 9:
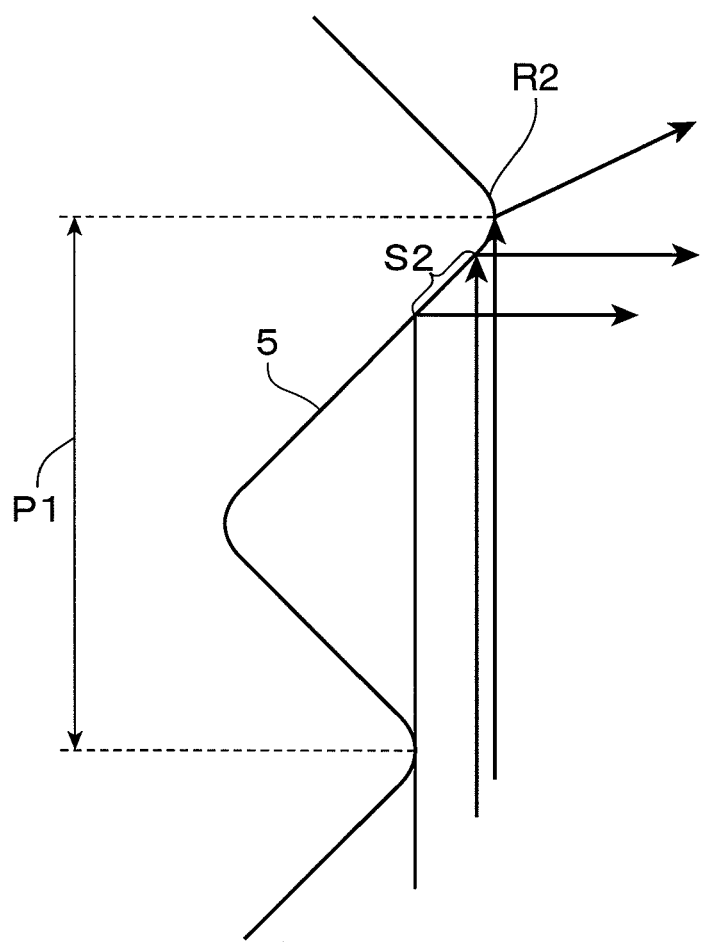
FIG. 9 is a view further enlarging the second side face of the light guiding plate of the LCD backlight device according to Embodiment 1 of the present invention.

The same can be true for the second side face 5. FIG. 9 is a diagram further enlarging the second side face 5 of the light guiding plate 3 of the LCD backlight device 101 according to Embodiment 1 of the present invention.

As FIG. 9 shows, the curvature R2 of the vertex of the triangular prism constituting the second side face 5 has several microns of curvature. If laser light is irradiated onto this portion, the laser light can be reflected up vertically, but can also be reflected in a direction inclined in the light traveling direction. If the pitch P1 of the triangular prism array between adjacent triangular prisms for reflecting approximately parallel laser light up vertically using the inclined surfaces of the triangular prisms is small, the area S2, where laser lights are vertically reflected by each prism, becomes small, and components that are vertically reflected as a total decrease. Therefore the pitch P1 should be as wide as possible.

The length L1 in the area illuminated two-dimensionally in the third side face 6 in the propagation direction of the laser light reflected by the second side face 5 corresponds to the length of the ridge between the second side face 5 and the third side face 6, that is, the length L3 (mm) of the second side face 5 in the longitudinal direction, and the length L2 of the ridge between the first side face 4 and the second side face 5 corresponds to the beam diameter of a laser light that enters the first side face 4, that is, a diameter D (mm) which is double that of FWHM (Full Width at Half Maximum) (see FIG. 1).

In this case, the pitch P1 of the triangular prism array constituting the second side face 5 shown in FIG. 9 can be specified to (0.01×L3/D) mm or more. For example, when L3=400 mm and D=10 mm, the pitch P1 of the triangular prism array is required to be 0.4 mm or more. In this case, the ratio of the light reflected vertically by the second side face 5 is 97% or more of all the light, so the loss of light utilization efficiency is confirmed in a negligible range. In this way, a system without light quantity loss can be implemented if the pitches P1 and P2 of the triangular prism array are set to predetermined values or more.

Figure 10:
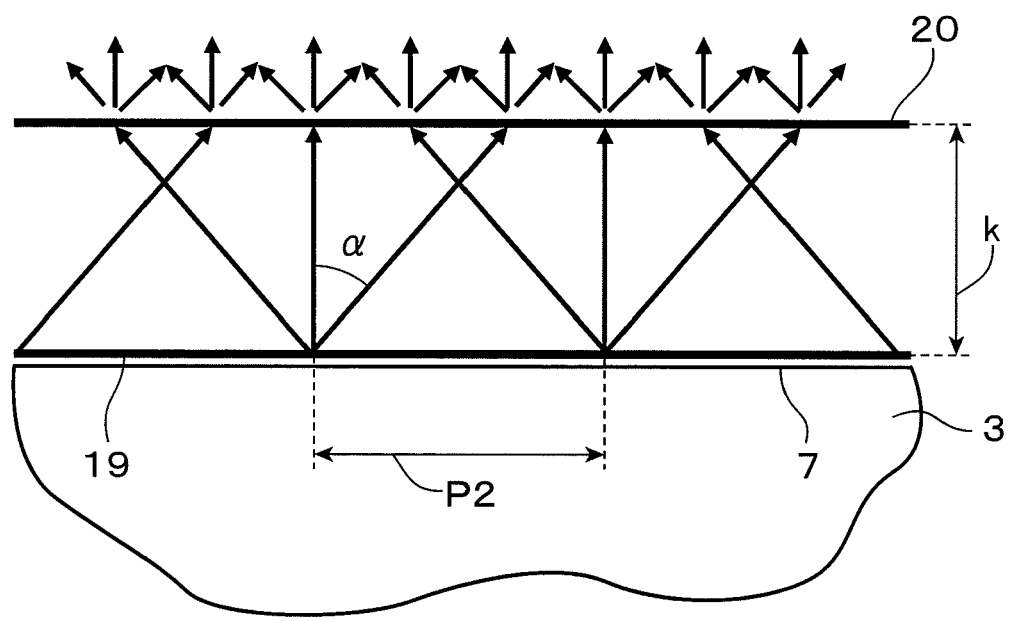
FIG. 10 is a diagram depicting a disposition of the diffusion plate according to Embodiment 1 of the present invention.

If stripes of the pitches P1 and P2 are visually recognized, or if the angle of view is to be expanded, a diffusion plate may be inserted. FIG. 10 is a diagram depicting the disposition of the diffusion plate according to Embodiment 1 of the present invention. As FIG. 10 shows, a first diffusion plate 19 is inserted into the light guiding plate surface 7, so as to diffuse the laser light emitted from the light guiding plate surface 7. If a second diffusion plate 20 is also disposed in a position away from the first diffusion plate 19 with the distance k, then brightness becomes more uniform, and an angle of view can be provided for the entire screen. If the diffusion angle of the first diffusion plate 19 is α at this time, it is even more preferable that the distance k is determined so that the laser light, in a position that is pitch P2 distant, can be overlapped with certainty.

If the distance k is greater than the greater value of $\{(0.01 \times L1/L2)/\tan \alpha\}$ mm and $\{(0.01 \times L3/D)/\tan \alpha\}$ mm, the stripes of the pitch can be overlapped, and a better image can be generated. L1 denotes a length of the planar illuminated area in the third side face 6 of the light guiding plate 3 in a propagation direction of the laser light reflected by the second side face 5 (see FIG. 2), L2 denotes a length of the ridge line between the first side face 4 and the second side face 5 of the light guiding plate 3, that is, the length of the first side face 4 or the second side face 5 in the short side direction (see FIG. 2), L3 denotes a length of the ridge line between the second side face 5 and the third side face 6, that is, the length of the second side face 5 in the longitudinal direction, and D is a beam diameter of a laser light that enters the first side face 4.

For example, if the diffusion angle α=30°, then a 1.2 mm or more distance is required between the first diffusion plate 19 and the second diffusion plate 20. The present configuration was described using the light guiding plate 3, but needless to say, a similar system can be constructed for the light guiding plate 14 as well. Here the diffusion angle α is defined by an angle at which the light density of laser light, that travel in the optical axis direction after transmitting the first diffusion plate 19, becomes $1/e^2$.

Figure 11:
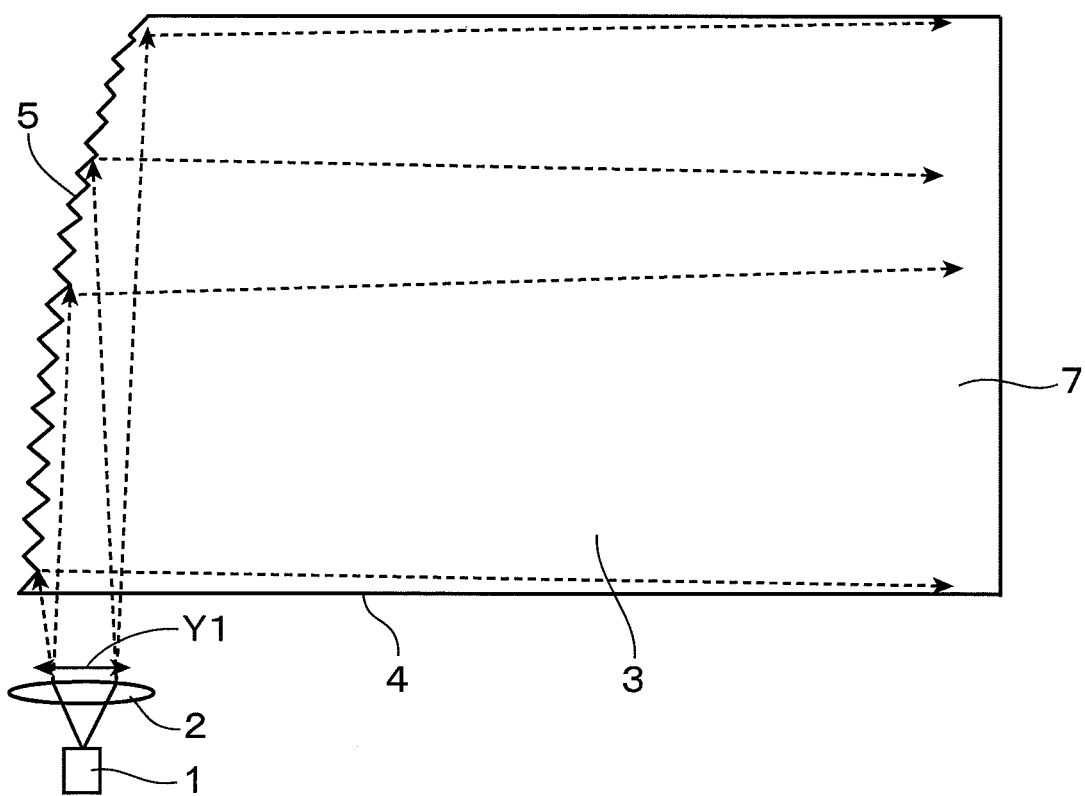
FIG. 11 is a conceptual diagram depicting a first method for removing speckle noise according to Embodiment 1 of the present invention.

Now the speckle noise countermeasure in a system using the light guiding plate 3 will be described. FIG. 11 is a conceptual diagram depicting a first method for removing the speckle noise in Embodiment 1 of the present invention.

Generally when a laser is used for the light source, glare is generated due to an interference called "speckle noise", because of mono-chromaticity, and this causes a problem that makes viewing images on a liquid crystal display displeasing. To solve this problem, as shown in FIG. 11 for example, the collimator lens 2 is vibrated in the longitudinal direction in the first side surface 4 (arrow Y1 direction in FIG. 11) in the surface, so that the laser light that enters the first side face 4 can be vibrated in a direction vertical to the optical axis. By this, the laser light emitted from the light guiding plate surface 7 vibrates, and a speckle pattern fluctuates in a time series, whereby the speckle noise is removed. In this case, for the form of the second side face 5, the coefficient An of the polynomial is selected so that the irradiation pattern from the second side face 5, after vibration of the collimator lens 2, becomes uniform. As a result, speckle noise can easily be removed while ensuring uniformity.

Another advantage of the configuration in FIG. 11 is that uniformity of the laser light does not fluctuate very much by dispersion and fluctuation of the light source profile. In other words, such factors as dispersion and fluctuation of the emission beam diameter from the collimator lens 2, due to individual dispersion and fluctuation of the spread angle of the laser light that is emitted from the laser light source 1, dispersion and fluctuation of the spread angle of the emission beam from the collimator lens 2, due to individual dispersion and fluctuation of the light source size of the laser light source 1, and dispersion of the emission beam diameter from the collimator lens 2, due to individual dispersion of the focal distance of the collimator lens 2, influence the uniformity of laser light emitted from the light guiding plate surface 7. However the configuration in FIG. 11 equalizes the light source profiles, so the uniformity of the laser light does not deteriorate very much. In this case, the LCD backlight device 101 further includes a drive unit that vibrates the collimator lens 2 in the longitudinal direction of the first side face 4.

Figure 12:
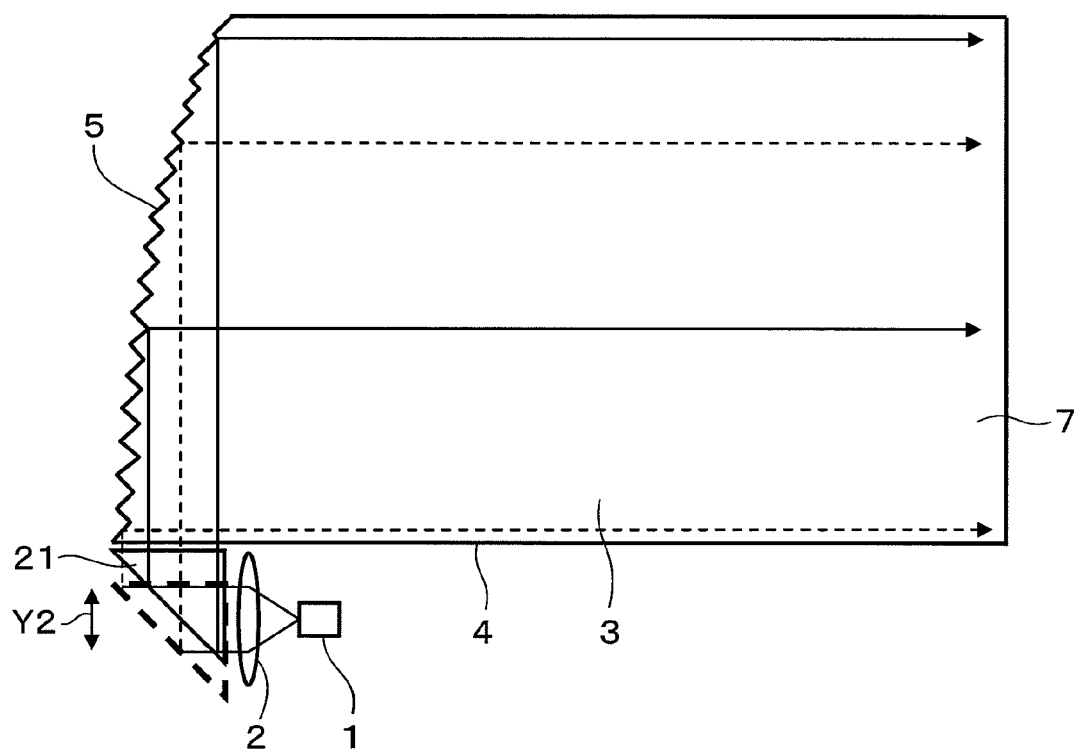
FIG. 12 is a conceptual diagram depicting a second method for removing speckle noise according to Embodiment 1 of the present invention.

Now a second method for removing the speckle noise in Embodiment 1 of the present invention will be described. FIG. 12 is a conceptual diagram depicting the second method for removing the speckle noise in Embodiment 1 of the present invention. The LCD backlight device shown in FIG. 12 has a laser light source 1, collimator lens 2, light guiding plate 3 and triangular prism 21.

In FIG. 12, the laser light emitted from the collimator lens 2 enters the triangular prism 21. The triangular prism 21 deflects the entered laser light 90°, and emits the deflected laser light toward the light guiding plate 3. In this case, the entering position of the laser light that enters the light guiding plate 3 can be vibrated by vibrating the triangular prism 21 in a direction vertical to the first side face 4 (arrow Y2 direction in FIG. 12). Thereby speckle noise can be suppressed and a system little of which uniformity of the laser light is affected by dispersion and fluctuation of the light source profile can be constructed, just like FIG. 11. In this case as well, to determine the form of the second side face 5, the coefficient An of a polynomial is selected so that the emission pattern, from the second side face 5 after vibration of the triangular prism 21, becomes uniform.

Figure 13:
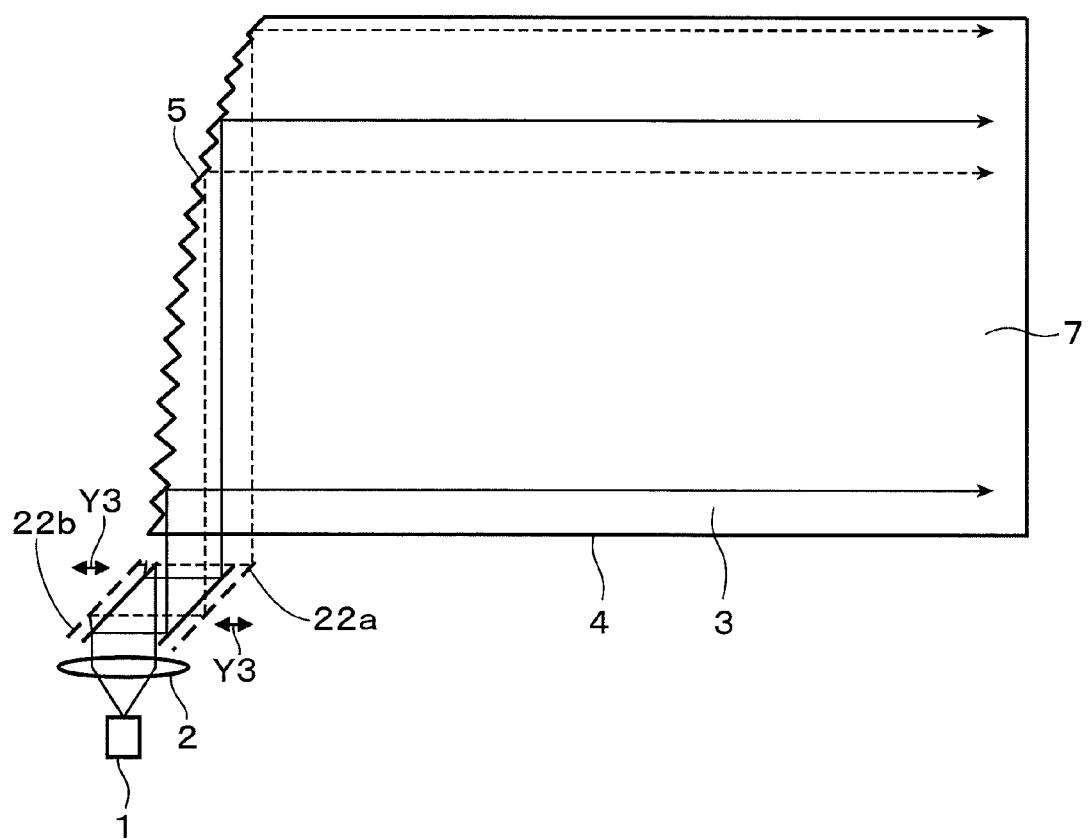
FIG. 13 is a conceptual diagram depicting a third method for removing speckle noise according to Embodiment 1 of the present invention.

A third method for removing the speckle noise in Embodiment 1 of the present invention will be described next. FIG. 13 is as conceptual diagram depicting the third method for removing the speckle noise in Embodiment 1 of the present invention. The LCD backlight device shown in FIG. 13 has a laser light source 1, collimator lens 2, light guiding plate 3 and mirrors 22a and 22b.

In FIG. 13, the laser light emitted from the collimator lens 2 enters the mirror 22b. The mirror 22b deflects the entered laser light 90°, and emits the deflected laser light toward the mirror 22a. The mirror 22a deflects the entered laser light 90°, and emits the deflected laser light toward the light guiding plate 3. In this case, the entrance position of the laser light that enters the light guiding plate 3 can be vibrated by synchronously vibrating the mirrors 22a and 22b in a longitudinal direction in the first side face 4 (arrow Y3 direction in FIG. 13). Thereby sparkle noise can be suppressed, and a system of which uniformity of the laser light is little affected by dispersion and fluctuation of the light source profile can be constructed, just like FIG. 11 and FIG. 12. In this case as well, to determine the form of the second side face 5, the coefficient An of a polynomial is selected so that the emission pattern from the second side face 5, after vibration of the mirrors 22a and 22b, becomes uniform. Here in this example both of the mirrors 22a and 22b are synchronously vibrated, but only one may be vibrated.

Figure 14:
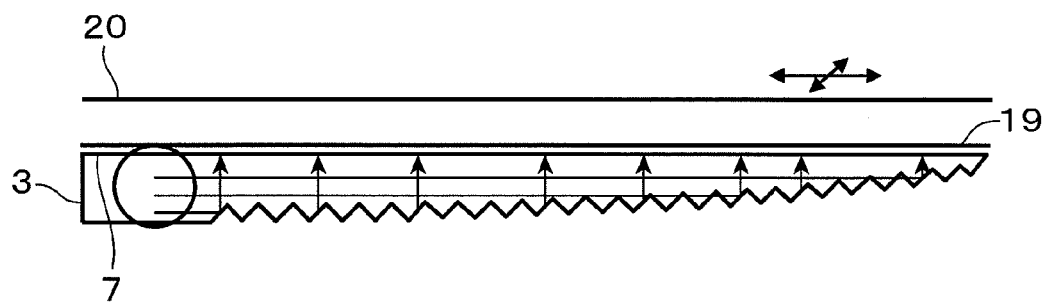
FIG. 14 is a conceptual diagram depicting a fourth method for removing speckle noise according to Embodiment 1 of the present invention.

A fourth method for removing the speckle noise in Embodiment 1 of the present invention will be described next. FIG. 14 is a conceptual diagram depicting the fourth method for removing the speckle noise in Embodiment 1 of the present invention.

The fourth method for removing the speckle noise is to remove the speckle noise completely by vibrating at least one of the first diffusion plate 19 and the second diffusion plate 20, that diffuse the laser light emitted from the light guiding plate surface 7, in the surface, as shown in FIG. 14. In this case, the LCD backlight device 101 further includes a drive unit that vibrates at least one of the first diffusion plate 19 and the second diffusion plate 20 in the surface. This configuration was described using the light guiding plate 3, but needless to say, a similar system can also be constructed using the light guiding plate 14.

Embodiment 2

Figure 15:
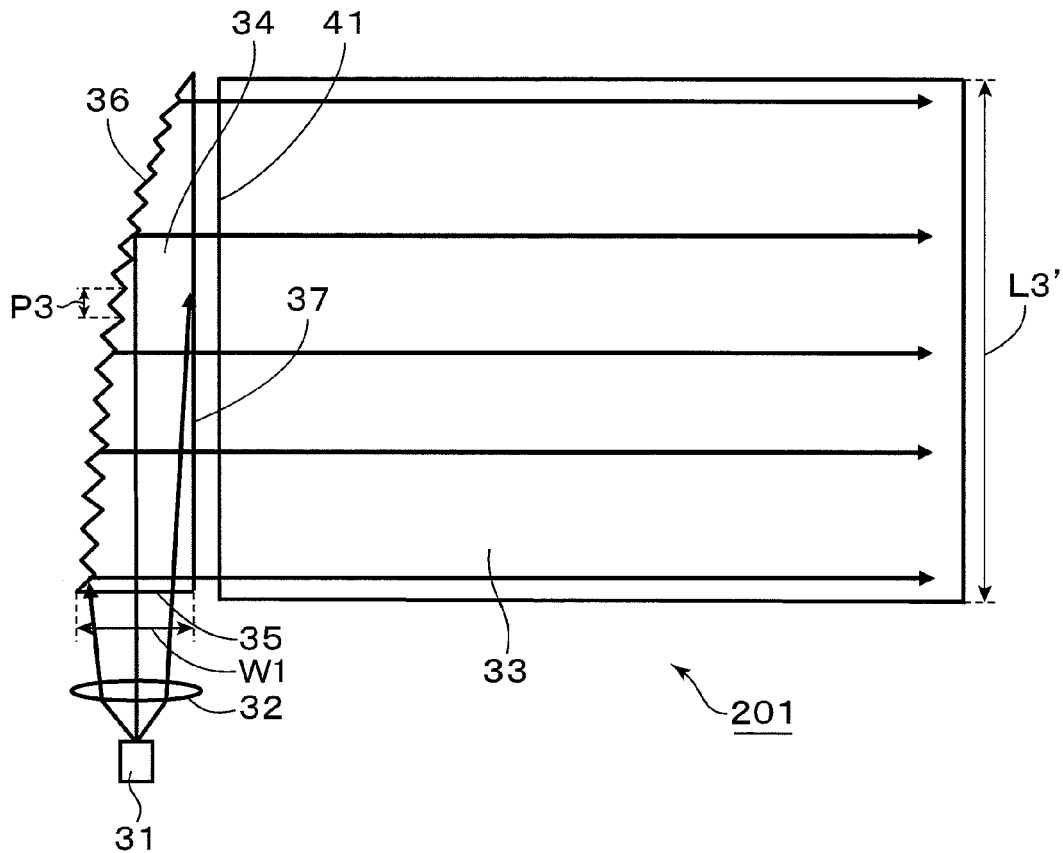
FIG. 15 is a front view depicting a configuration of the LCD backlight device according to Embodiment 2 of the present invention.
Figure 16:
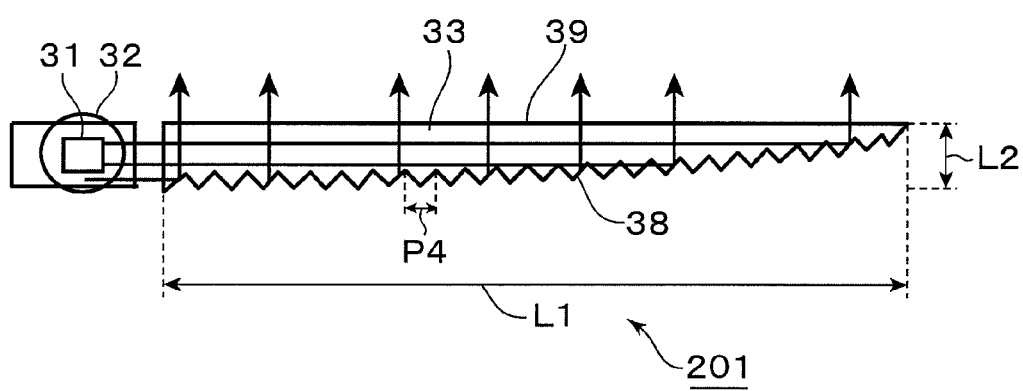
FIG. 16 is a side view depicting a configuration of the LCD backlight device according to Embodiment 2 of the present invention.

FIG. 15 is a front view depicting a configuration of an LCD backlight device according to Embodiment 2 of the present invention, and FIG. 16 is a side view depicting a configuration of the LCD backlight device according to Embodiment 2 of the present invention. FIG. 16 is a diagram depicting the LCD backlight device shown in FIG. 15 viewed from the laser light source side. The LCD backlight device 201 according to Embodiment 2 is comprised of only four components, that is, a laser light source 31, collimator lens 32, light guiding plate 33 and light guiding bar 34.

Operation of the LCD backlight device 201 according to Embodiment 2 will now be described. Laser light emitted from the laser light source 31 is transformed into approximately parallel light by the collimator lens 32. The laser light transformed into approximately parallel lights enters into the light guiding bar 34 via a laser light entrance surface 35 of the light guiding bar 34. The laser light which entered into the light guiding bar 34 reaches a laser light reflection surface 36 that is adjacent to the laser light entrance surface 35, while a part of the light are being totally reflected by the laser light emission surface 37 of the light guiding bar 34.

In the laser light reflection surface 36, a triangular prism array is constructed on a predetermined curve, just like the case of the second side face 5 in Embodiment 1. If the angle formed by the inclined surface in the laser light entrance surface 35 side of each triangular prism, constituting the triangular prism array, and the optical axis is 45°, then the laser light that reaches each triangular prism is reflected at about a 90° angle according to the entering angle into each inclined angle by each inclined surface of the reached triangular prism respectively, and is transformed into linear laser light, just like Embodiment 1 shown in FIG. 3. The linear laser light is emitted from the laser light emission surface 37 of the light guiding bar 34. The laser light emitted from the light guiding bar 34 directly enters the laser light entrance surface 41 of the light guiding plate 33, and then, just like Embodiment 1, is totally reflected approximately at a right angle by the laser light reflection surface 38 of the light guiding plate 33, and is vertically emitted from the laser light emission surface 39.

In this case, the form of the laser light reflection surface 36 of the light guiding bar 34 can be determined in the same way as the second side face 5 of Embodiment 1. In other words, a position of a vertex of the triangular prism is expressed by a line of the polynomial (3) of degree 2 or more, according to the profile of the laser light source to be used, where an origin is the vertex of the triangular prism closest to an intersection of the laser light entrance surface 35 and the laser light reflection surface 36. The coefficient An of the polynomial (3) of degree 2 or more is determined so that the profile of the linear laser light emitted from the laser light emission surface 37 of the light guiding bar 34 becomes approximately uniform.

$$\sum_{n=0}^{n\geq 2} An \times X^n \qquad (3)$$

Here n denotes a degree of the polynomial, An denotes a coefficient of degree n, and the X axis is a traveling direction of the laser light when the origin is the intersection of the laser light entrance surface 35 and the laser light reflection surface 36. To determine the form of the laser light reflection surface 38 of the light guiding plate 33, the coefficient Bn is determined, just like Embodiment 1, and description thereof is omitted here.

In Embodiment 1, the light guiding plate 33 and the light guiding bar 34 of Embodiment 2 are integrated, but are molded as separate components in Embodiment 2. For example, in the case of using a fiber light source shown in FIG. 5 for the laser light source 31, if a thick multi-mode fiber with a core diameter close to 1 mm is used, laser light after being collimated by the collimator lens 32 does not become parallel, and propagates while spreading at an angle that depends on the focal distance of the collimator lens 32 and the numerical aperture of the fiber. In this case, further downsizing can be expected if the light guiding plate 33 and the light guiding bar 34 are separated.

The present Embodiment 2 as well has similar characteristics as Embodiment 1, such as high light utilization efficiency, low cost, uniform brightness, no uneven color, as described in Embodiment 1, and it is clear that these characteristics diminish little even if Embodiment 2 is used. In order to transform laser light into linear laser lights, the laser lights ise normally reflected by a hologram mirror or the like, as Patent Literature 1 discloses, but it is difficult to reflect all three colors, R, G and B, at high utilization efficiency, in terms of the above mentioned diffraction efficiency. However according to Embodiment 2, which still uses the light guiding bar 34, a part of the laser light is totally reflected by the laser light emission surface 37 of the light guiding bar 34, but a part of the laser light propagates at most at the distance of the light guiding bar 34 in the longitudinal direction from the laser light entering the light guiding bar 34 to emitting from it. Therefore absorption loss inside the light guiding plate can be minimized, and surface reflection is generated only at two locations, that is at the laser light entrance surface 35 of the light guiding bar 34 and the laser light emission surface 37 of the light guiding bar 34. The surface reflection on each surface is small, about 3.5%, in a non-coated state, and can be decreased to about 1% if coating is applied on each surface, hence this device can be constructed while maintaining high light utilization efficiency.

In the present embodiment, the laser light entrance surface 35 corresponds to an example of the entrance surface of the light guiding bar, the laser light reflection surface 36 corresponds to an example of the linear reflection surface of the light guiding bar, the laser light emission surface 37 corresponds to an example of the emission surface of the light guiding bar, the laser light entrance surface 41 corresponds to an example of the entrance surface of the light guiding plate, the laser light reflection surface 38 corresponds to an example of the planar reflection surface of the light guiding plate, and the laser light emission surface 39 corresponds to an example of the emission surface of the light guiding plate.

Furthermore according to the present embodiment, the light guiding bar 34 and the light guiding plate 33 correspond to an example of the light guiding unit. The light guiding bar 34 has the light entrance surface 35 (entrance surface), to which laser light from the laser light source enters, the laser light reflection surface 36 (linear reflection surface) which is adjacent to the laser light entrance surface 35 and transforms the laser light into the linear laser light by reflecting the laser light which entered from the laser light entrance surface 35, and the laser light emission surface 37 (emission surface) which is adjacent to the laser light entrance surface 35 and faces the laser light reflection surface 36, and emits the linear laser light transformed by the laser light reflection surface 36. The light guiding plate 33 has a laser light entrance surface 41 (entrance surface) to which the linear laser light emitted from the laser light emission surface 37 of the light guiding bar 34 enters, a laser light reflection surface 38 (planar reflection surface) which is adjacent to the laser light entrance surface 41 and transforms the linear laser light into planar laser light by reflecting the linear laser light which entered from the laser light entrance surface 41 using a plurality of reflection surfaces, and the laser light emission surface 39 (emission surface) which emits the planar laser light transformed by the laser light reflection surface 38.

The light guiding plate 3 that has the first side face 4 (entrance surface) to which the laser light enters, the second side face 5 (linear reflection surface) that is adjacent to the first side face 4, and transforms the laser light into linear laser light by reflecting the laser light which entered from the first side face 4, the third side face 6 (planar reflection surface) that transforms the linear laser light into planar laser light by reflecting the linear laser light using a plurality of reflection surfaces formed along the entrance direction of the linearly transformed laser light, and the light guiding plate surface 7 (emission surface) that emits the planar laser light transformed by the third side face 6, corresponds to an example of the light guiding unit.

Figure 17:
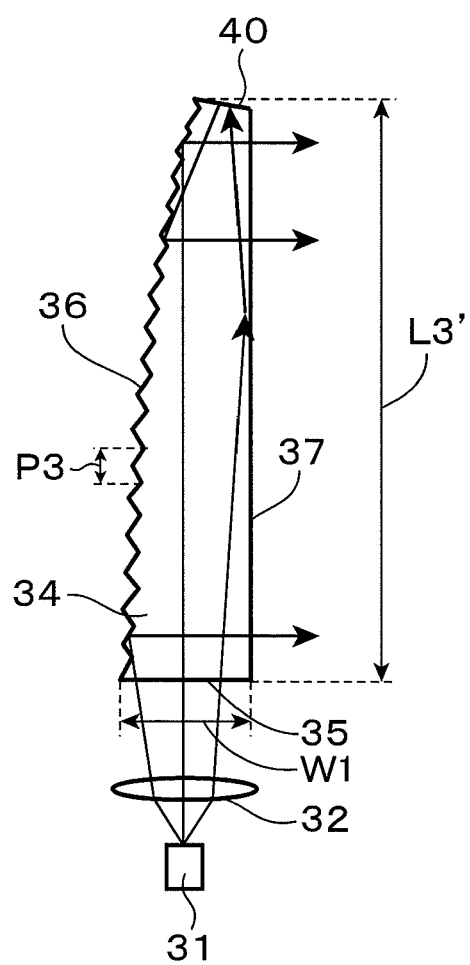
FIG. 17 is a diagram depicting a configuration of the light guiding bar of the LCD backlight device according to a variant form of Embodiment 2 of the present invention.

Now another possible configuration of the light guiding bar 34 will be described with reference to FIG. 17. FIG. 17 is a diagram depicting a configuration of the light guiding bar of the LCD backlight device according to a variant form of Embodiment 2 of the present invention. In FIG. 6 of Embodiment 1, the fourth side face 17 is disposed, and the laser light which reached the fourth side face 17 is reflected toward the third side face 6, so that the processing of the light guiding plate 3 can be easier. The same is true for the light guiding bar 34. In other words, the light guiding bar 34 according to the variant form of Embodiment 2 further has a reflection surface 40 in a position facing the laser light entrance surface 35. The reflection surface 40 is inclined at a predetermined angle with respect to a plane vertical to the optical axis. In the present embodiment, the reflection surface 40 corresponds to an example of the reflection surface of the light guiding bar.

The laser light emitted from the laser light source 31 enters the laser light entrance surface 35 of the light guiding bar 34 via the collimator lens 32, and reach the reflection surface 40, while a part of the laser light is being totally reflected by the light guiding bar 34. The reflection surface 40 is coated for reflection, so that the entered laser light is reflected toward the laser light reflection surface 36 side. The laser light that reached from the reflection surface 40 to the laser light reflection surface 36 is reflected approximately vertical toward the laser light emission surface 37 of the light guiding bar 34 by the inclined surface in the reflection surface 40 side of the triangular prism.

By this, just like the light guiding plate 14 of Embodiment 1, dispersion of thickness of the light guiding bar 34 is decreased, so processing of the light guiding bar 34 becomes easier, and manufacturing cost can be decreased. In FIG. 17 as well, the reflection surface 40 is inclined toward the laser light reflection surface 36 side, but may be inclined toward the laser light emission surface 37 side of the light guiding bar 34. In this case, the laser light reflected by the reflection surface 40 can be totally reflected by the laser light emission surface 37 of the light guiding bar 34, then eventually reaches the laser light reflection surface 36, and is reflected by the laser light reflection surface 36, so as to be emitted from the laser light emission surface 37. In this case, the position of the vertex of the triangular prism is expressed by the polynomial of degree 2 or more, shown in the above mentioned Expression (3), and if the coefficient An of the polynomial is determined considering the amount of the reflected light from the reflection surface 40, then uniform brightness distribution can be obtained, as mentioned above.

If the reflection surface 40 is inclined toward the laser light emission surface 37 side, the inclination of the reflection surface 40 can also be a draft for injection molding, therefore the light guiding bar 34 can be molded very easily, and cost can be kept down. In this system as well, which still uses the light guiding bar 34, the laser light propagates at most at a distance that is double along the longitudinal direction of the light guiding bar 34, from the laser light entering the light guiding bar 34 to being emitted from the light guiding bar 34, even if a part of the laser light is totally reflected by the laser light emission surface 37. Hence the reflection surface 40 can be constructed while maintaining the high light utilization efficiency. In Embodiment 2 as well, it is clear that the light guiding plate 33 can have a same form as the fourth side face 17 of the light guiding plate 14 of Embodiment 1, therefore redundant description is omitted in Embodiment 2.

Now the pitch of the triangular prism array constituting the laser light reflection surface 36 will be described. Just like Embodiment 1, the vertex of the triangular prism has a certain radius of curvature because of restrictions in processing. In Embodiment 1, the pitch P1 of the triangular prism array of the second side face 5 is specified using the beam diameter (diameter double FWHM) D of the laser light that enters the first side face 4, and the length L3 of the ridge between the second side face 5 and the third side face 6. In Embodiment 2, on the other hand, the width W1 of the laser light entrance surface 35 of the light guiding bar 34 corresponds to the beam diameter D of Embodiment 1, and the length L3' of the laser light reflection surface 36 in the longitudinal direction corresponds to the length L3 of Embodiment 1. In other words, the pitch P3 of the laser light reflection surface 36 of the light guiding bar 34 can be specified by (0.01×L3'/W1) mm or more. In this case, the ratio of the light reflected vertically by the laser light reflection surface 36 is 97% or more, which is the same as Embodiment 1, so loss of light utilization efficiency can be confined in a negligible range, maintaining high light utilization efficiency.

In Embodiment 2 as well, the first diffusion plate 19 and the second diffusion plate 20 in Embodiment 1 can be used, and it is clear that a speckle noise countermeasure can be taken by setting the diffusion angle α and distance k, in the same manner as Embodiment 1, so redundant description is omitted in Embodiment 2. It is also clear that suppressing the speckle noise by vibration of the collimator lens 2, triangular prism 21 and mirrors 22a and 22b, and decreasing the influence of fluctuation and dispersion of the light source profile on uniformity of the laser light according to Embodiment 1, can be performed in Embodiment 2, so redundant description is omitted in Embodiment 2.

Figure 18:
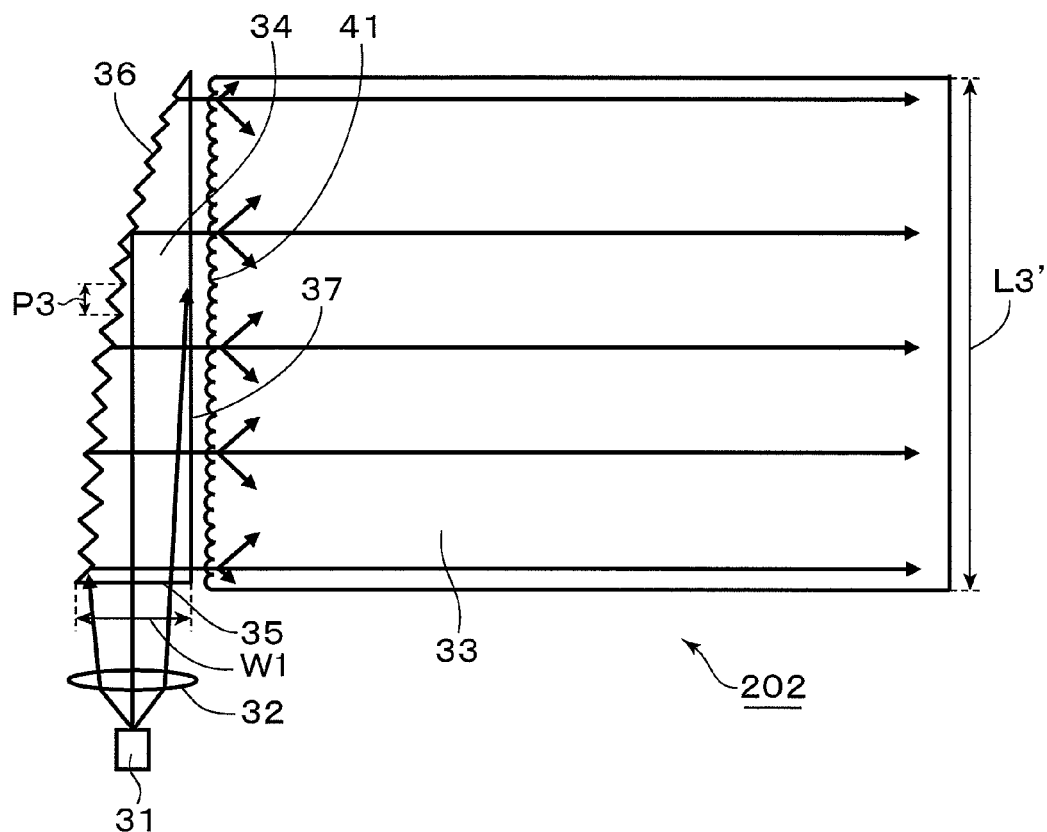
FIG. 18 is a front view depicting a configuration of the LCD backlight device according to another variant form of Embodiment 2 of the present invention.

As FIG. 18 shows, in Embodiment 2, a cylindrical lens array may be constructed on the laser light emission surface 37 of the light guiding bar 34 or the laser light entrance surface 41 of the light guiding plate 33, and the laser light emission surface 39, instead of using one or both of the first diffusion plate 19 and the second diffusion plate 20, so that the angle of view is improved, and brightness can be made to be more uniform.

Figure 19:
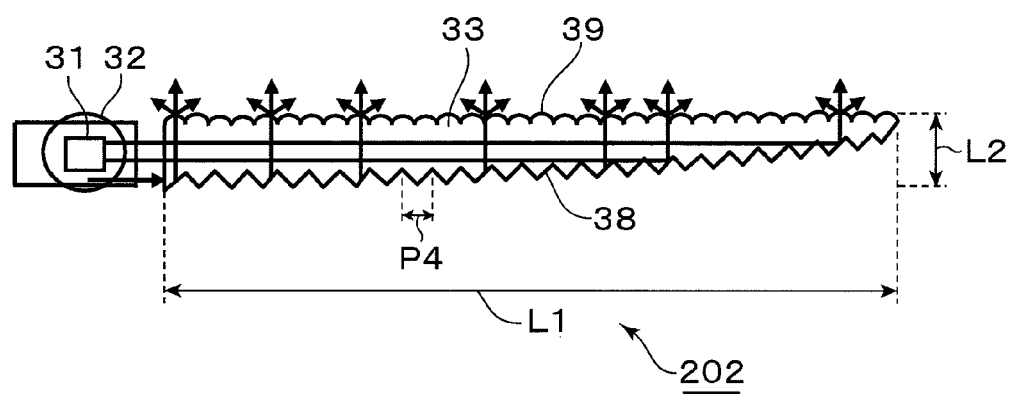
FIG. 19 is a side view depicting a configuration of the LCD backlight device according to another variant form of Embodiment 2 of the present invention.

FIG. 18 is a front view depicting a configuration of an LCD backlight device according to another variant form of Embodiment 2 of the present invention, and FIG. 19 is a side view depicting a configuration of the LCD backlight device according to another variant form of Embodiment 2 of the present invention. FIG. 19 is a diagram depicting the LCD backlight device in FIG. 18, viewed from the laser light source side.

In the LCD backlight device 202 shown in FIG. 18, the laser light entrance surface 41 of the light guiding plate 33 is constituted by a cylindrical lens array which expands the laser light in the longitudinal direction of the laser light entrance surface 41, and the laser light emission surface 39 of the light guiding plate 33 is constituted by a spherical lens array.

In Embodiment 2, the laser light emission surface 39 of the light guiding plate 33 is constituted by a spherical lens array, but the present invention is not limited to this, and the laser light emission surface 39 of the light guiding plate 33 may be constituted by a cylindrical lens array.

In FIG. 18, for example, the laser light which is linearly reflected by the laser light reflection surface 36 of the light guiding bar 34 and emitted from the laser light emission surface 37 is expanded by the cylindrical lens array formed in the laser light entrance surface 41 of the light guiding plate 33 in the surface. The laser light expanded by the cylindrical lens array propagates through the light guiding plate 33 while a part of the light is totally reflected by the side face of the light guiding plate 33, reflected by the laser light reflection surface 38, and emitted from the laser light emission surface 39 approximately vertically. At this time, the same effect as diffusion in a certain direction of the first diffusion plate 19 can be implemented by expanding the laser light in the longitudinal direction of the light guiding plate 33, using a cylindrical lens array disposed on the laser light entrance surface 41.

The planar laser light reflected by the laser light reflection surface 38 is diffused by a spherical lens array formed on the laser light emission surface 39 of the light guiding plate 33 in the surface, and the laser light diffused by the spherical lens array is emitted from the light guiding plate 33. If the cylindrical lens array is disposed on the laser light entrance surface 41 of the light guiding plate 33, and the spherical lens array is disposed on the laser light emission surface 39 of the light guiding plate 33, then the first diffusion plate 19 and the second diffusion plate 20 need not be disposed.

If the cylindrical lens array is disposed on the laser light entrance surface 41 of the light guiding plate 33 and the spherical lens array is not disposed on the laser light emission surface 39 of the light guiding plate 33, one of the first diffusion plate 19 and the second diffusion plate 20 could be disposed, then brightness becomes more uniform, and the angle of view can be provided for the entire screen. Thereby light quantity loss (about 7%, mostly surface reflection) generated when the laser light transmits through one diffusion plate, can be prevented, and higher light utilization efficiency can be implemented while ensuring uniformity of brightness and wide angle of view.

In FIG. 18, the cylindrical lens array disposed on the laser light entrance surface 41 of the light guiding plate 33 may be disposed on the laser light emission surface 37 of the light guiding plate 34. A similar effect can also be expected by disposing a spherical lens array only on the laser light emission surface 39 of the light guiding plate 33 without disposing the cylindrical lens array on the laser light entrance surface 41 of the light guiding plate 33 or the laser light emission surface 37 of the light guiding bar 34. The cylindrical lens array may be disposed on either the laser light entrance surface 41 of the light guiding plate 33 or the laser light emission surface 37 of the light guiding bar 34 without disposing the spherical lens array on the laser light emission surface 39 of the light guiding plate 33.

Figure 20:
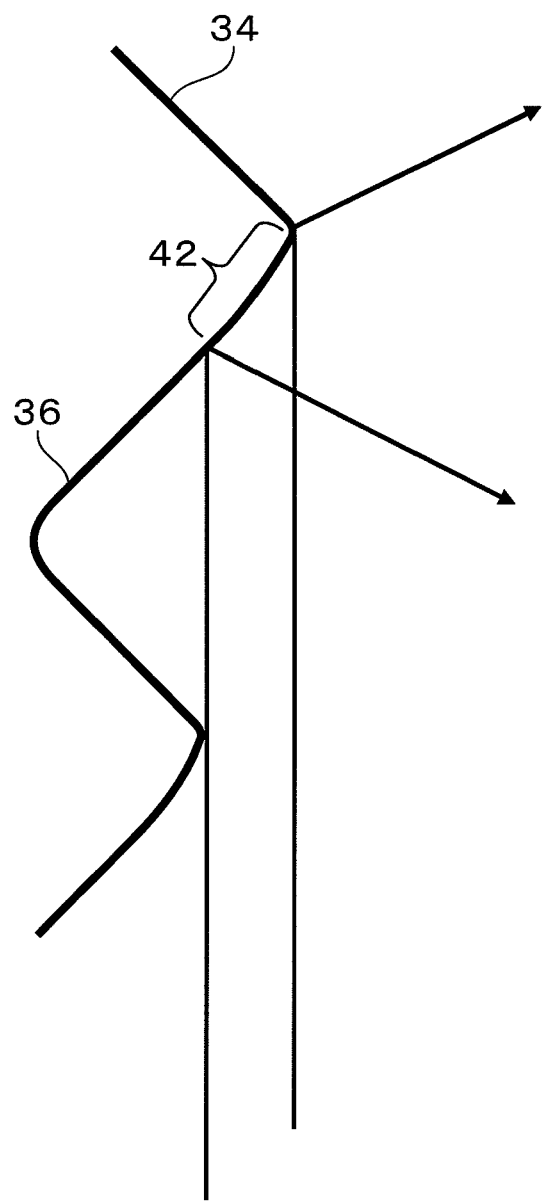
FIG. 20 is an enlarged view depicting a laser light reflection surface of the light guiding bar according to still another variant form of Embodiment 2 of the present invention.

Instead of disposing the lens array on the laser light entrance surface 41 or the laser light emission surface 39 of the light guiding plate 33, the emission angle of the laser light can be expanded by making the vertex of the triangular prism of the laser light reflection surface 36 of the light guiding bar 34, or the vertex of the triangular prism of the laser light reflection surface 38 of the light guiding plate 33, a curved surface. FIG. 20 is an enlarged view of the laser light reflection surface of the light guiding bar according to another variant form of Embodiment 2 of the present invention. As FIG. 20 shows, the curved surface portion 42 is formed around the vertex of the triangular prism of the laser light reflection surface 36 of the light guiding bar 34. Thereby the laser light which entered the curved surface portion 42 is reflected while being diffused. The curved surface portion may be formed around the vertex of the triangular prism of the laser light reflection surface 38 of the light guiding plate 33, although this is not illustrated.

Figure 21:
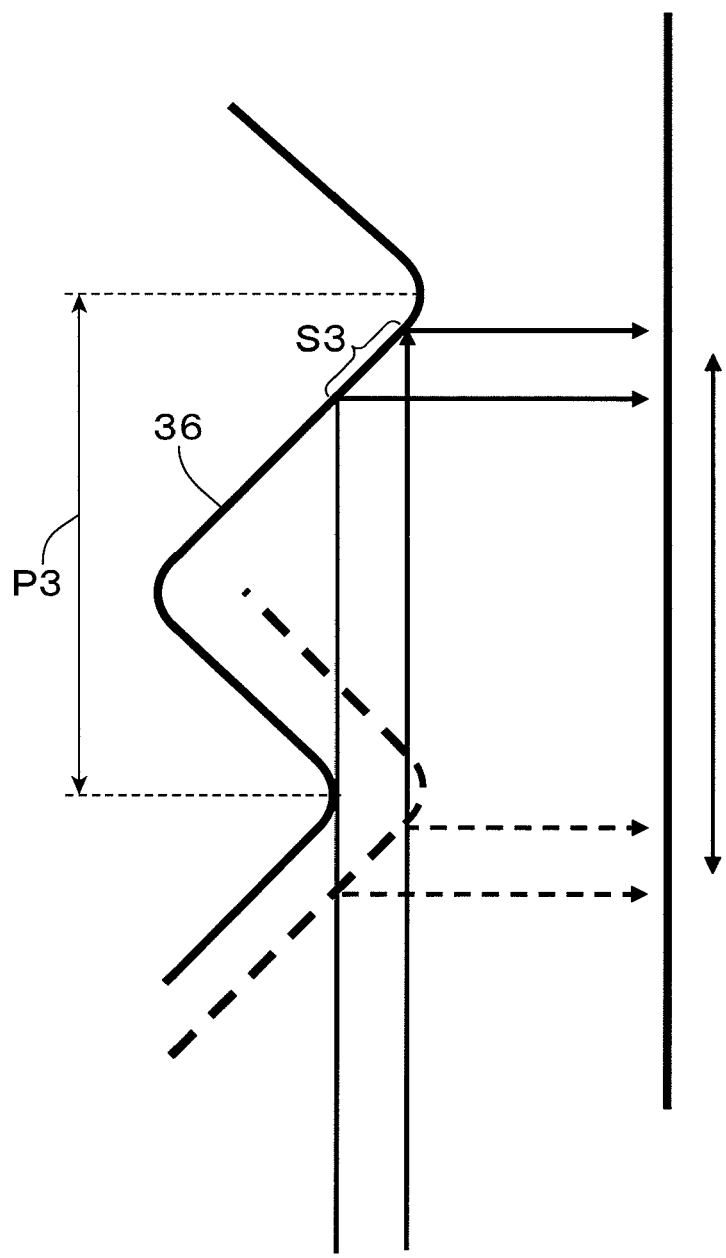
FIG. 21 is a conceptual diagram depicting a method for removing speckle noise according to Embodiment 2 of the present invention.

Now the sparkle noise countermeasure in Embodiment 2 will be described with reference to FIG. 21. FIG. 21 is a conceptual diagram depicting a method for the speckle noise in Embodiment 2 of the present invention. An area S3 is an area to reflect the laser light in a triangular prism in one location constituting the laser light reflection surface 36. If the light guiding bar 34 is shifted by pitch P3 in the longitudinal direction of the light guiding bar 34 shown in FIG. 15, then the position of the laser light reflected by the area S3 shifts by pitch P3. In other words, by vibrating the light guiding bar 34 in the longitudinal direction of the laser light emission surface 37 of the light guiding bar 34 in FIG. 15 with an amplitude the same as pitch P3, the laser light scans the micro area having a width the same as the pitch P3 of each triangular prism by shifting horizontally. In this case, the LCD backlight device 201 also has a drive unit that vibrates the light guiding bar 34 in the longitudinal direction of the laser light emission surface 37 of the light guiding bar 34 with an amplitude the same as the pitch P3.

Thereby the illumination area fluctuates in a time series, and the speckle pattern fluctuates in a time series, and as a result, the speckle noise can be cancelled. This is the same for the case of using a trapezoidal prism, instead of a triangular prism.

Embodiment 3

Figure 22:
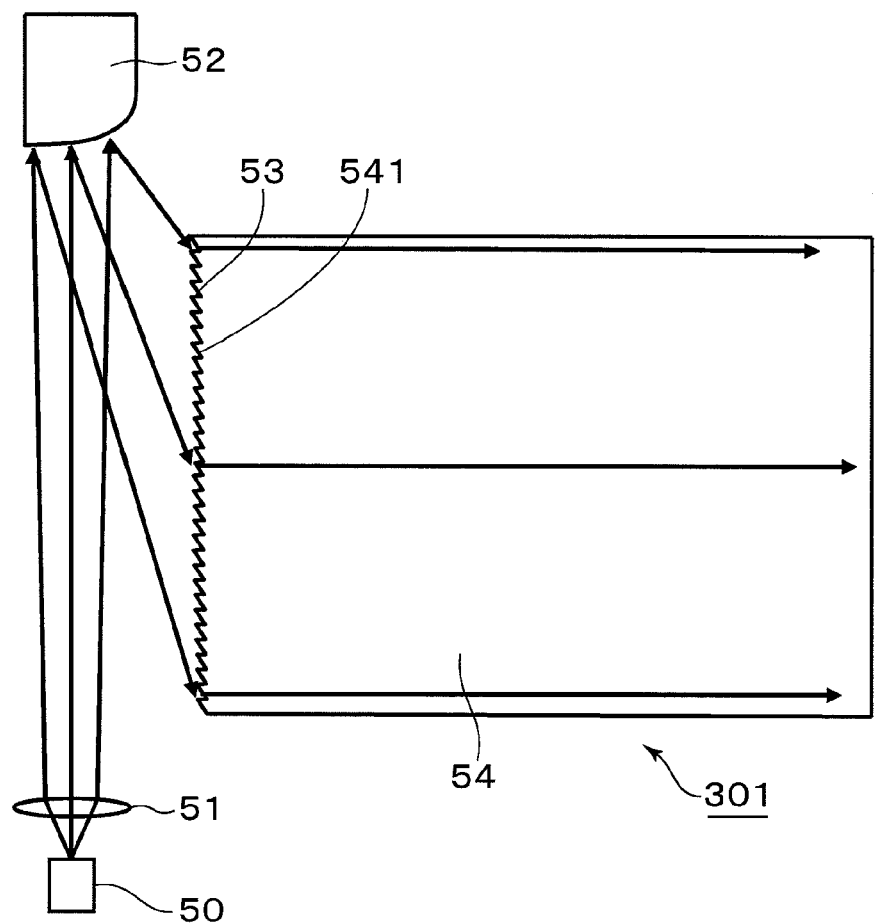
FIG. 22 is a front view depicting a configuration of the LCD backlight device according to Embodiment 3 of the present invention.
Figure 23:
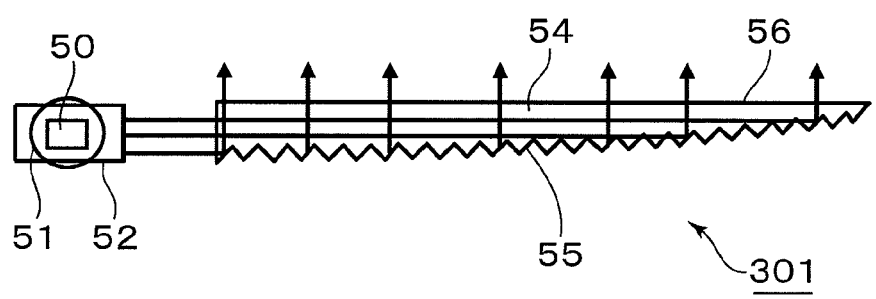
FIG. 23 is a side view depicting a configuration of the LCD backlight device according to Embodiment 3 of the present invention.

FIG. 22 is a front view depicting a configuration of an LCD backlight device according to Embodiment 3 of the present invention, and FIG. 23 is a side view depicting a configuration of the LCD backlight device according to Embodiment 3 of the present invention. FIG. 23 is a diagram depicting the LCD backlight device, shown in FIG. 22, viewed from the laser light source side. The LCD backlight device 301 according to Embodiment 3 is comprised of a laser light source 50, collimator lens 51, free-form surface mirror 52 and light guiding plate 54, and a prism array 53 is formed on a laser light entrance surface 541 of the light guiding plate 54.

The operation of the LCD backlight device 301 according to Embodiment 3 will now be described. Laser light emitted from the laser light source 50 is transformed into approximately parallel light by the collimator lens 51. The laser light transformed into approximately parallel light enters the free-form surface mirror 52. The form of the reflection surface of the free-form surface mirror 52 is determined such that the reflected laser light has approximately uniform linear laser light quantity distribution on the prism array 53 that is formed on the side face in the free-form surface mirror 52 side in the light guiding plate 54.

The prism array 53 transforms the laser light reflected by the free-form surface mirror 52 to be telecentric. The laser light transformed to be telecentric by the prism array 53 enters into the light guiding plate 54, and are totally reflected by the triangular prism array that is formed on the laser light reflection surface 55 of the light guiding plate 54, and are emitted from the laser light emission surface 56 of the light guiding plate 54 approximately vertically, just like Embodiments 1 and 2.

In the present embodiment, the laser light entrance surface 541 corresponds to an example of the entrance surface of the light guiding plate, the prism array 53 corresponds to an example of the transformation optical system, the laser reflection surface 55 corresponds to an example of the planar reflection surface of the light guiding plate, and the laser light emission surface 56 corresponds to an example of the emission surface of the light guiding plate.

In the present embodiment, the free-form surface mirror 52 and the light guiding plate 54 correspond to an example of the light guiding unit. The free-form surface mirror 52 transforms the laser light into linear laser light by diffuse-reflecting the laser light from the laser light source 50. The light guiding plate 54 has a laser light entrance surface 541 (entrance surface) on which the transformation optical system, where the laser light transformed into linear laser lights by the free-form surface mirror 52 enters and the entered laser light is transformed to be telecentric, is formed, a laser light reflection surface 55 (planar reflection surface) that is adjacent to the laser light entrance surface 541, and transforms linear laser light which was transformed to be telecentric by the laser light entrance surface 541 into planar laser light by reflecting the linear laser light using a plurality of reflection surfaces, and a laser light emission surface 56 (emission surface) that emits the planar laser light transformed by the laser light reflection surface 55.

Figure 24:
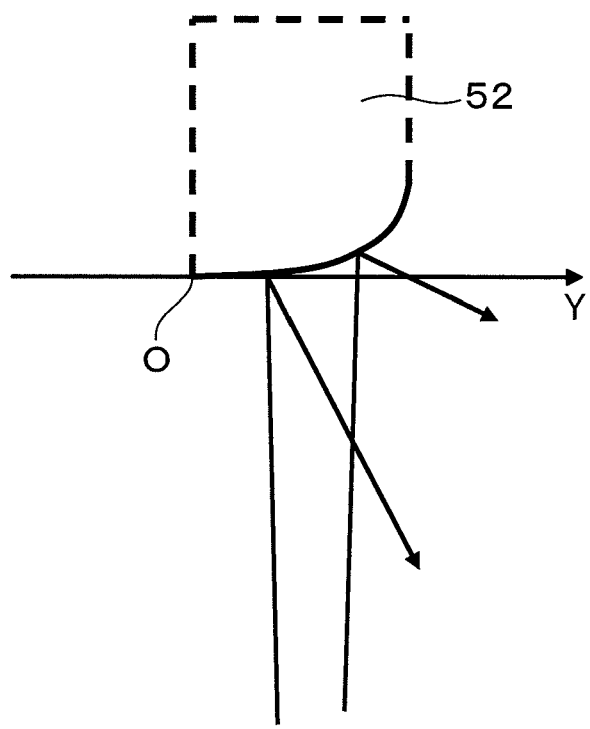
FIG. 24 is a diagram depicting a free-form surface mirror according to Embodiment 3 of the present invention.

FIG. 24 is a diagram depicting the free-form surface mirror in Embodiment 3 of the present invention. The reflection surface of the free-form surface mirror 52 can be expressed by a polynomial of degree 8 or more, as shown in the following Expression (4), using point O in FIG. 24 as an origin.

$$\sum_{n=0}^{n \geq 8} Cn \times Y^n \qquad (4)$$

Here n denotes a degree of the polynomial, Cn denotes a coefficient of degree n, and, in terms of the Y direction, the Y axis is a direction perpendicular to the entering direction of the laser light into the free-form surface mirror 52, and the positive direction of the Y axis is a direction approaching the light guiding plate 54. Approximately uniform light quantity distribution cannot be implemented with a polynomial of degree 7 or less.

The effect of using this configuration is that the light utilization efficiency is high and cost is low, even if an element for transforming light into linear laser light is disposed separately from the light guiding plate. In order to transform laser light into linear laser light using the reflection of a mirror, the light is reflected by a hologram mirror or the like as shown in Patent Literature 1, but it is difficult to reflect all three colors, R, G and B, with high light utilization efficiency in terms of diffraction efficiency. In Embodiment 3 however, uniformity is ensured only by the form of a mirror, without forming a hologram on a mirror, therefore reflection loss is hardly generated if an HR (High Reflectance) coat is applied to the surface of the free-form surface mirror 52.

Just like Embodiments 1 and 2, the laser light that entered the light guiding plate 54 essentially propagates only for the amount of length of the light guiding plate 54 in the laser light propagation direction, so an increase of absorption loss due to an increase of propagation distance caused by multiple reflection, as mentioned in Patent Literature 2, does not occur. Uniform brightness distribution, higher light utilization efficiency by maintaining the polarization direction, and essentially no generation of uneven color are also ensured in Embodiment 3 as well as in Embodiments 1 and 2.

Figure 25:
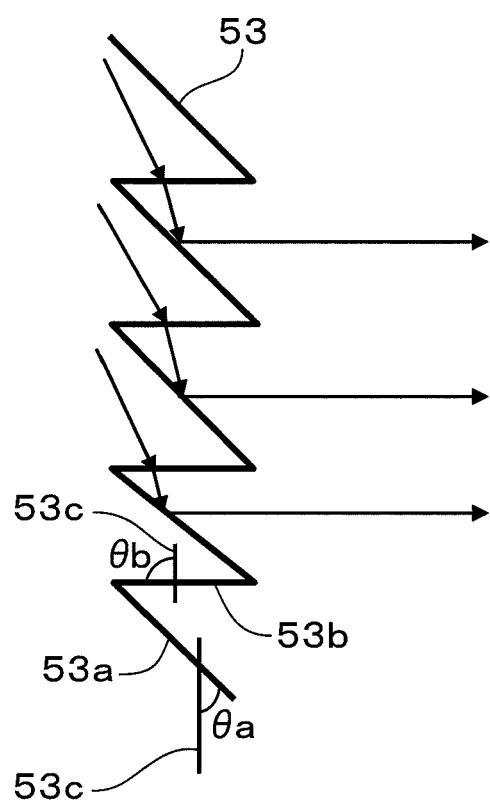
FIG. 25 is a conceptual diagram depicting a prism array according to Embodiment 3 of the present invention.

Now the prism array 53 formed in the side face in the free-form surface mirror 52 side of the light guiding plate 54 will be described with reference to FIG. 25. FIG. 25 is a conceptual diagram depicting the prism array according to Embodiment 3 of the present invention. Each prism of the prism array 53 has an inclined surface 53a in the laser light source 50 side, and an inclined surface 53b in the free-form surface mirror 52 side, and each inclined surface 53a and 53b is inclined at angles θa and θb respectively with respect to the entrance surface 53c. The angles θa and θb may be different depending on the prism.

The laser light reflected by the free-form surface mirror 52 transmits through and enters into the inclined surface 53b of each prism, is totally reflected by the inclined surface 53a, and propagates in the light guiding plate 54 telecentrically from each prism. In this case, the distance between the free-form surface mirror 52 and the light guiding plate 54 can be decreased at least in theory, as long as there is no interference with laser light propagating from the collimator lens 51 to the free-form surface mirror 52, which allows dramatically decreasing the size of the configuration of the optical system of Embodiment 3. To transform laser light to be telecentric, a Fresnel lens is often used, but a Fresnel lens must be separated away from the free-form surface mirror for the amount of focal distance, which leads to increasing the size of the optical system. By using a prism array instead, as in the case of Embodiment 3, an LCD backlight device can be constructed to be an extremely small size.

Figure 26:
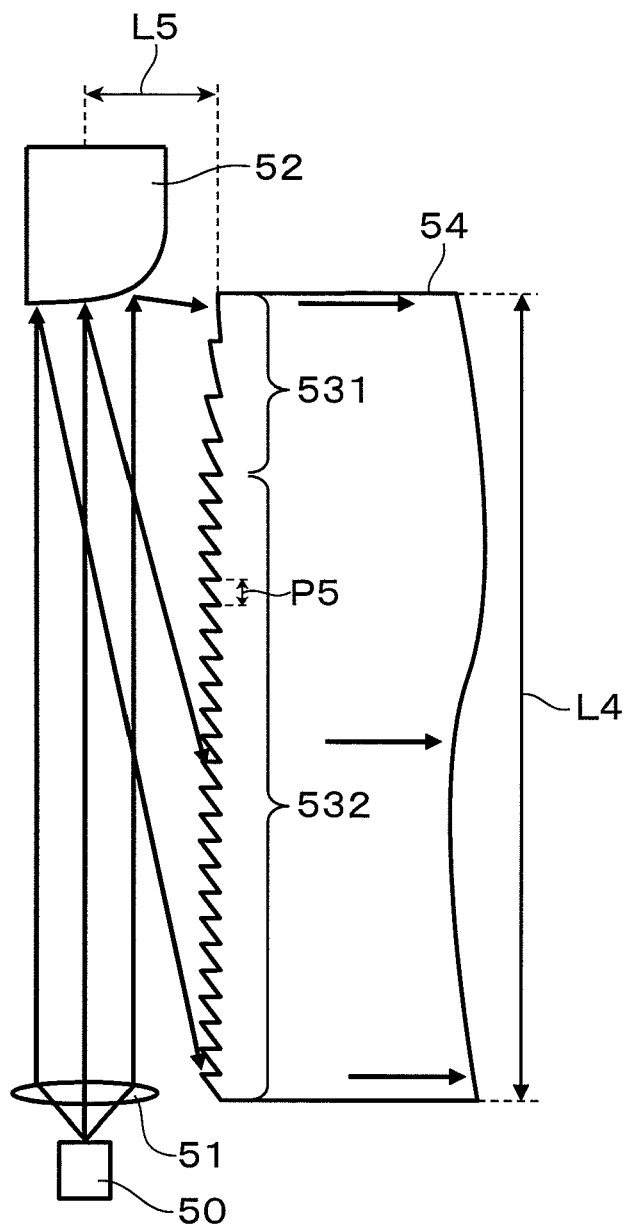
FIG. 26 is a diagram depicting a configuration of the light guiding plate of the LCD backlight device according to a variant form of Embodiment 3 of the present invention.

FIG. 26 is a diagram depicting a configuration of the light guiding plate of the LCD backlight device according to a variant form of Embodiment 3 of the present invention. As FIG. 26 shows, the light guiding plate 54 may be constituted by a Fresnel lens for the portion of the area 531 in FIG. 26, and a prism array for the portion of the area 532 in FIG. 26. This means that in the laser light entrance surface of the light guiding plate 54, the area 531 in the free-form surface mirror 52 side is constituted by the Fresnel lens, and the area 532 in the laser light source 50 side is constituted by the prism array. By this configuration, the free-form surface mirror 52 can be disposed closer to the laser light source 50 side, which makes further downsizing possible.

In other words, the laser light reflected at an approximately vertical angle, that is less than a predetermined value in the free-from surface mirror 52, cannot be transformed to be telecentric if the prism array in the area 532 in FIG. 26 is used, but can be transformed to be telecentric by deflection if the Fresnel lens in the area 531 in FIG. 26 is used. The laser light reflected at an approximately horizontal angle, that is less than a predetermined value, cannot be deflected to be telecentric if the Fresnel lens is used, but can be transformed to be telecentric if the prism array in the area 532 in FIG. 26 is used. In other words, by utilizing the respective advantages of the Fresnel lens and the prism array, a compact configuration that cannot be implemented by one approach becomes possible.

Figure 27:
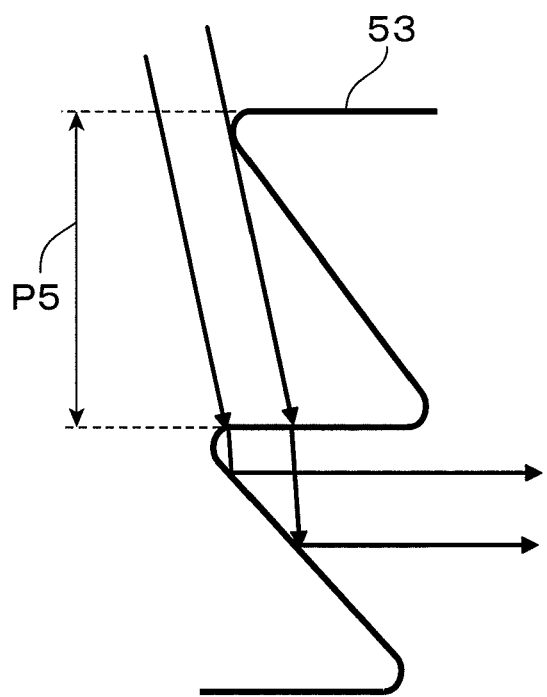
FIG. 27 is a diagram depicting a pitch of the prism array according to Embodiment 3 of the present invention.

Now the pitch of the prism array in Embodiment 3 will be described. FIG. 27 is a diagram depicting the pitch of the prism array in Embodiment 3 of the present invention. As FIG. 27 shows, several microns of curvature are generated in the vertex of each prism of the prism array 53 through processing, for the same reason as the prism array of the light guiding plate 3 of Embodiment 1 and the light guiding bar 34 of Embodiment 2. Transmittance of the laser light into the prism drops if the laser light enters the curvature portion, so minimizing the ratio of the curvature portion is desirable. For this, it is preferable that the pitch P5 of the prism array 53 is (0.1×L4/L5) mm or more. Here L4 denotes a length of the light guiding plate 54 in the prism array 53 side, that is the length of the light guiding plate 54 in the longitudinal direction of the laser light entrance surface, L5 denotes a distance from the free-form surface mirror 52 to the prism array 53, that is the length from the center of the free-form surface mirror 52 (optical axis of the laser light that enters the free-form surface mirror 52) to the laser light entrance surface of the light guiding plate 54 (see FIG. 26). By this, light quantity loss when the laser light enters from the prism array 53 to the light guiding plate 54 can be confined to a negligible range.

Figure 28:
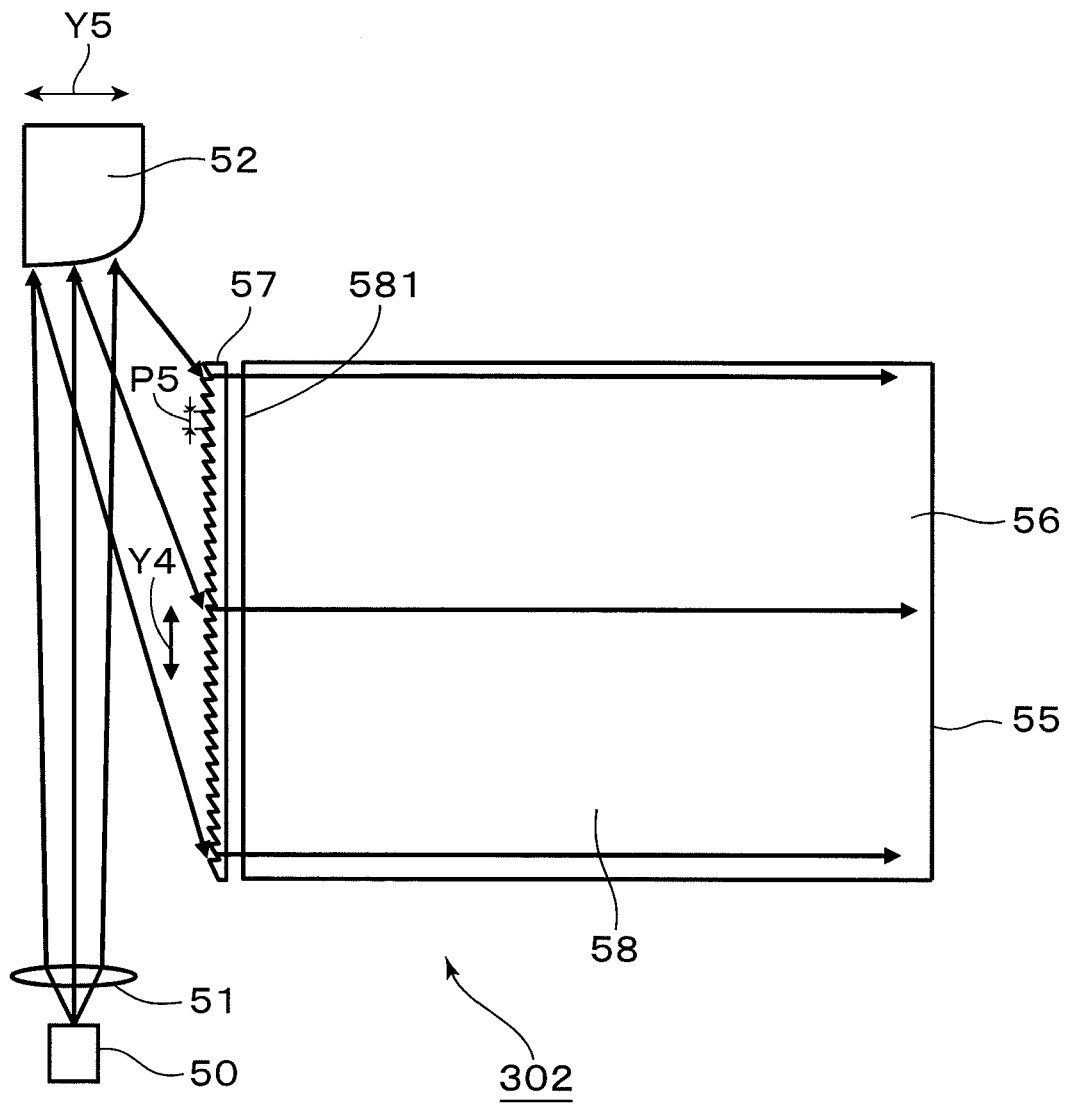
FIG. 28 is a diagram depicting a configuration of the LCD backlight device according to another variant form of Embodiment 3 of the present invention.

Now the speckle noise countermeasure in Embodiment 3 will be described with reference to FIG. 28. FIG. 28 is a diagram depicting a configuration of an LCD backlight device according to another variant form of Embodiment 3 of the present invention. The LCD backlight device 302 shown in FIG. 28 has a laser light source 50, collimator lens 51, free-form surface mirror 52, prism array 57 and light guiding plate 58. In the LCD backlight device 301 shown in FIG. 22, the prism array 53 and the light guiding plate 54 are integrated, but in the LCD backlight device 302 shown in FIG. 28, the prism array 57 and the light guiding plate 58 are separated.

Laser light emitted from the laser light source 50 is first transformed into approximately parallel light by the collimator lens 51. The laser light transformed to be approximately parallel enters the free-form surface mirror 52. The form of the reflection surface of the free-form surface mirror 52 is determined such that the reflected laser light has approximately uniform linear laser light quantity distribution on the prism array 57 that is formed on the side face in the free-form surface mirror 52 side of the light guiding plate 54.

The prism array 57 transforms the laser light reflected by the free-form surface mirror 52 to be telecentric. The laser light transformed to be telecentric by the prism array 57 enters the laser light entrance surface 581 of the light guiding plate 58, totally reflected by the triangular prism array formed on the laser light reflection surface of the light guiding plate 58, and is emitted approximately vertically from the laser light emission surface of the light guiding plate 58. The laser light reflection surface and the laser light emission surface of the light guiding plate 58 have the same configurations as the laser light reflection surface 55 and the laser light emission surface 56 of the light guiding plate 54 in FIG. 23. In this variant form of the present embodiment, the prism array 57 corresponds to an example of the transformation optical system, and the laser light entrance surface 581 corresponds to an example of the entrance surface of the light guiding plate.

In this variant form of the present embodiment, the free-form surface mirror 52, prism array 57 and light guiding plate 58 correspond to an example of the light guiding unit. The free-form surface mirror 52 transforms laser light into linear laser light by diffuse-reflecting the laser light from the laser light source 50. The prism array 57 transforms the linear laser light transformed by the free-form surface mirror 52 to be telecentric. The light guiding plate 58 has a laser light entrance surface 581 (entrance surface) where the linear laser light transformed to be telecentric by the prism array 57 enters, a laser light reflection surface 55 (planar reflection surface) that is adjacent to the laser light entrance surface 581 and transforms the linear laser light into planar laser light by reflecting the linear laser light which entered from the laser light entrance surface 581 using a plurality of reflection surfaces, and a laser light emission surface 56 (emission surface) that emits the planar laser light transformed by the laser light reflection surface 55.

A first speckle noise removal method involves separating the prism array 57 from the light guiding plate 58, and vibrating the prism array 57 in the longitudinal direction of the prism array 57 (arrow Y4 direction in FIG. 28) with an interval longer than the pitch P5 of the prism array 57, so that the speckle noise can be decreased.

As mentioned above, each prism of the prism array 57 is disposed with the space of pitch P5. Therefore by vibrating the prism array 57 in the longitudinal direction with pitch P5 or more, the laser light transmitted through the prism array 57 scans the micro area having a width the same as pitch P5 of the prism array 57 by shifting horizontally, just like the case of the light guiding bar 34 in Embodiment 2. By this, the speckle pattern fluctuates in a time series, and the speckle noise can be cancelled, and brightness can be further uniform at the same time. In this case, the LCD backlight device 302 further has a drive unit that vibrates the prism array 57 in the longitudinal direction with pitch P5 or more.

Another speckle noise removal method involves vibrating the free-form surface mirror 52 within the laser light propagating surface in a direction vertical to the entering direction (optical axis) of the laser light into the free-form surface mirror 52 (arrow Y5 direction in FIG. 28). By vibrating the free-form surface mirror 52 in a direction vertical to the optical axis, the reflection direction by the free-form surface mirror 52 can be fluctuated. Thereby the propagation direction of the laser light in the light guiding plate 58 fluctuates in a time series, and speckle patterns fluctuate in a time series, and as a result, speckle noise is no longer visually recognized. In this case, the LCD backlight device 302 also has a drive unit that vibrates the free-form surface mirror 52 in a direction vertical to the optical axis. This speckle noise removal method is effective with certainty even if the prism array 57 is integrated with the light guiding plate 58.

In Embodiment 3 as well, the position of the vertex of the laser light reflection surface 55 of the light guiding plate 54 and the pitch of the triangular prism array constituting the laser light reflection surface 55 are the same as Embodiments 1 and 2, therefore redundant description is omitted in Embodiment 3.

Needless to say, the same effect as Embodiment 1 can be expected by the light guiding plate 54 or 58 in Embodiment 3 having the same form as the fourth side face 17 of the light guiding plate 14 of Embodiment 1. In other words, the light guiding plate 54 or 58 may have the reflection surface, that is inclined toward the laser light reflection surface 55 side or laser light emission surface 56 side, in a position where the light guiding plate 54 or 58 faces the laser light entrance surface.

In Embodiment 3 as well, the first diffusion plate 19 and the second diffusion plate 20 in Embodiment 1 can be used, and needless to say, the diffusion angle α and distance k can be set as a speckle noise countermeasure, just like Embodiment 1.

In Embodiment 3 as well, just like the cylindrical array formed on the laser light entrance surface 41 of the light guiding plate 33 in Embodiment 2, the number of diffusion plates can be decreased by forming the cylindrical array on the laser light entrance surface 581 of the light guiding plate 58. Also just like the cylindrical array or spherical lens array formed on the laser light emission surface 39 of the light guiding plate 33 in Embodiment 2, the number of diffusion plates can be decreased by forming the cylindrical array or spherical array on the laser light emission surface 541 of the light guiding plate 54 or 58.

Embodiment 4

Figure 29:
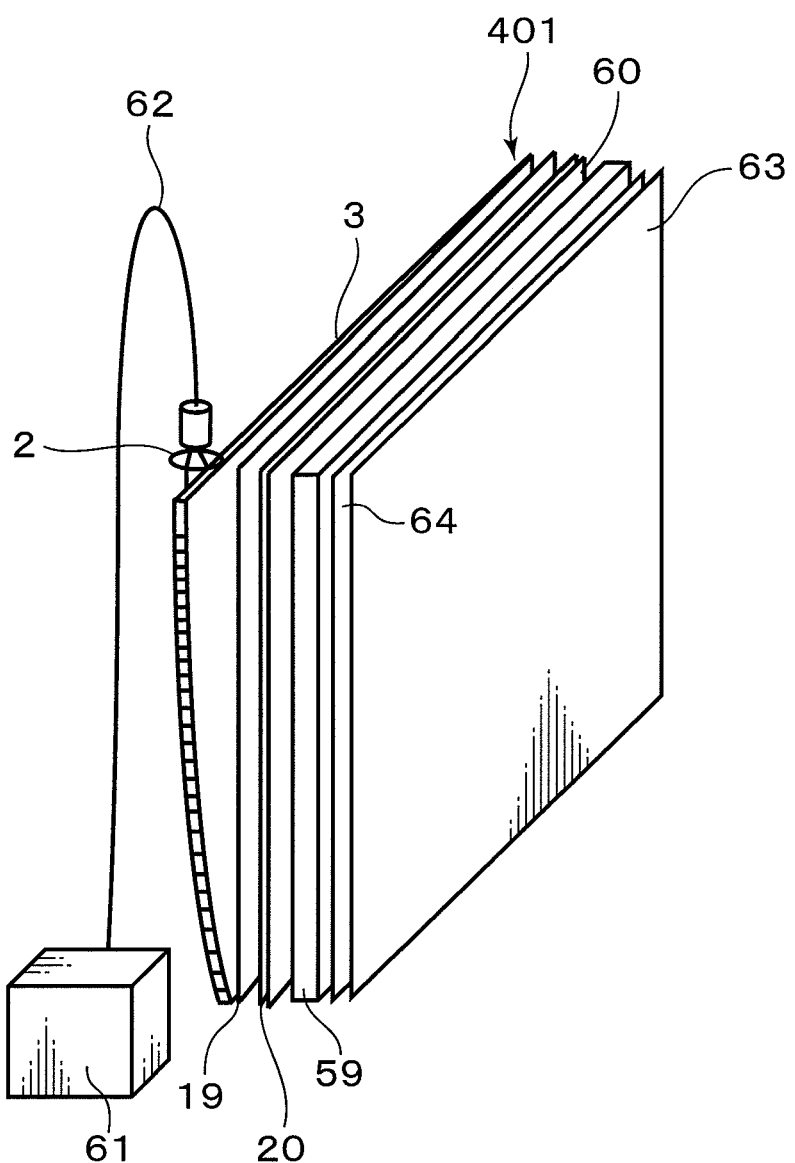
FIG. 29 is a diagram depicting the liquid crystal display according to Embodiment 4 of the present invention.

FIG. 29 is a diagram depicting a configuration of a liquid crystal display according to Embodiment 4 of the present invention. The liquid crystal display according to embodiment 4 has an LCD backlight device 401, liquid crystal panel 59, first polarization filter 60, color filter 64 and second polarization filter 63. The LCD backlight device 401 has a laser light source 61, fiber 62, collimator lens 2, light guiding plate 3, first diffusion plate 19 and second diffusion plate 20. The configuration of the LCD backlight device 401 is the same as the LCD backlight device 101 of Embodiment 1, except that the laser light source 61 and the fiber 62 are equipped instead of the laser light source 1.

Operation of the liquid crystal display according to Embodiment 4 will now be described. The laser light emitted from the laser light source 61 is coupled with the fiber 62 and guided to the light guiding plate 3. The laser light source 61 emits laser light in which laser light with each color, R, G and B, are mixed. The laser light emitted from the fiber 62 is transformed into approximately parallel light by the collimator lens 2. The laser light transformed into the approximately parallel light is aligned in the polarization direction by the polarized beam splitter, ½ wavelength plate and reducer, which are not illustrated, and then enter the light guiding plate 3. The laser light which entered the light guiding plate 3 is transformed into planar laser light by the second side face 5 and the third side face 6, as described in Embodiment 1, and then is emitted.

The laser light emitted from the light guiding plate 3 transmits through the first diffusion plate 19 and the second diffusion plate 20, and then transmits through the first polarization filter 60. The first polarization filter 60 transmits only light having a predetermined polarizing direction. The laser light transmitted through the first polarization filter 60 transmits through the liquid crystal panel 59, and then transmits through the color filter 64. The liquid crystal panel 59 transmits the entered laser light with a predetermined light quantity for each pixel. The liquid crystal panel 59 is an example of a two-dimensional spatial modulation element that two-dimensionally modulates the light intensity of the laser light. The color filter 64 transmits the entered laser light in locations corresponding to each color, R, G and B. The laser light transmitted through the color filter 64 transmits through the second polarization filter 63, that is disposed to be in a cross-Nichol position with the first polarization filter 60. In this way, a desired image can be obtained.

The present liquid crystal display uses the LCD backlight device described in Embodiment 1, therefore the number of components is small, the display can be constructed to be extremely thin and light. Since the liquid crystal display itself can be very light by separating the laser light source 61 from the liquid crystal display main body, as in the case of Embodiment 4, the liquid crystal display can be mounted on a wall.

The liquid crystal display according to Embodiment 4 has the LCD backlight device according to Embodiment 1, but the present invention is not limited to this, and the liquid crystal display may have the LCD backlight device according to Embodiment 2 or Embodiment 3.

The above mentioned embodiments mainly include aspects of the invention that have the following configurations.

A liquid crystal display backlight device according to an aspect of the present invention has a laser light source that emits laser light, and a light guiding unit that transforms the laser light from the laser light source into linear laser light, and transforms the linear laser light into a planar laser light, and emits the planar laser light, and the light guiding unit includes a light guiding plate that has a planar reflection surface for transforming the linear laser light into the planar laser light by reflecting the linear laser light by a plurality of reflection surfaces that are formed along the entrance direction of the linear laser light.

According to this configuration, the light guiding unit transforms the laser light from the laser light source into linear laser light, and transforms the linear laser light into the planar laser light, and emits the planar laser light. Since the linear laser light is transformed into the planar laser light by the planar reflection surface disposed on the light guiding plate so that the linear laser light is reflected using the plurality of reflection surfaces disposed along the entering direction of the linear laser light, light quantity loss can be suppressed, and brightness can be uniform.

For the planar reflection surface, linear laser light may be totally reflected using a plurality of reflection surfaces formed along the entering direction of the linear laser light. Also for the planar reflection surfaces, when the linear laser light is split into a plurality of lights along the direction vertical to the entering direction of the linear laser light, the split laser light may be reflected by a plurality of reflection surfaces respectively.

In the above mentioned liquid crystal display backlight device, it is preferable that the light guiding unit includes a light guiding plate that has an entrance surface where the laser light enters, a linear reflection surface that is adjacent to the entrance surface and transforms the laser light into linear laser light by reflecting the laser light which entered from the entrance surface, the planar reflection surface, and an emission surface that emits the planar laser light transformed by the planar reflection surface, and the planar reflection surface is adjacent to the entrance surface and the linear reflection surface, and transforms the linear laser light into planar laser light by reflecting the linear laser light transformed by the linear reflection surface, using the plurality of reflection surfaces.

According to this configuration, the laser light from the laser light source enters the entrance surface of the light guiding plate. The laser light which entered from the entrance surface is transformed into linear laser light by the linear reflection surface adjacent to the entrance surface, and the linear laser light linearly transformed by the linear reflection surface is transformed into planar laser light by the planar reflection surface adjacent to the entrance surface and the linear reflection surface. Then laser light transformed into planar laser light by the planar reflection surface is emitted from the emission surface.

Therefore the light quantity loss can be limited to the surface reflection on the entrance surface and emission surface, and the absorption inside the light guiding plate. Instead of reflecting the laser light by a plurality of half mirrors, the linear laser light is reflected by the planar reflection surface, so brightness can be uniform.

In the above mentioned liquid crystal display backlight device, it is preferable that the light guiding unit includes a light guiding bar that has an entrance surface where the laser light from the laser light source enters, a linear reflection surface that is adjacent to the entrance surface and transforms the laser light which entered from the entrance surface into linear laser light by reflecting the laser light, and an emission surface that is adjacent to the entrance surface and faces the linear reflection surface, and emits the linear laser light transformed by the linear reflection surface; and a light guiding plate that has an entrance surface where the linear laser light emitted from the emission surface of the light guiding bar enters, the planar reflection surface, and an emission surface that emits the planar laser light transformed by the planar reflection surface, and the planar reflection surface is adjacent to the entrance surface, and transforms the linear laser light which entered from the entrance surface into planar laser light by reflecting the laser light using the plurality of reflection surfaces.

According to this configuration, the laser light from the laser light source enters the entrance surface of the light guiding bar. The laser light that entered from the entrance surface is transformed into linear laser light by the linear reflection surface adjacent to the entrance surface, and the linear laser light is emitted from the emission surface that is adjacent to the entrance surface and faces the linear reflection surface. Then the linear laser light emitted from the emission surface of the light guiding bar enters the entrance surface of the light guiding plate. The linear laser light which entered from the entrance surface is transformed into the planar laser light by the planar reflection surface adjacent to the entrance surface. And the planar laser light transformed by the planar reflection surface is emitted from the emission surface.

Therefore the light quantity loss of the laser light, from entering the light guiding bar to emitting from it, can be limited to the surface reflection on the entrance surface of the light guiding bar and the emission surface of the light guiding bar, and absorption in the light guiding bar, and light quantity loss of the laser light, from entering the light guiding plate to emitting from it, can be limited to the surface reflection on the entrance surface of the light guiding plate and emission surface of the light guiding plate, and absorption on the light guiding plate. Instead of reflecting the laser light by a plurality of half mirrors, the linear laser light is reflected by the planar reflection surface, so brightness can be uniform.

In the above mentioned liquid crystal display backlight device, it is preferable that the light guiding unit includes: a free-form surface mirror that transforms the laser light from the laser light source into linear laser light by diffuse-reflecting the laser light; and a light guiding plate that has an entrance surface on which a transformation optical system, where the linear laser light transformed by the free-form surface mirror enters, and the entered linear laser light is transformed to be telecentric, is formed, the planar reflection surface, and an emission surface that emits the planar laser light transformed by the planar reflection surface, and the planar reflection surface is adjacent to the entrance surface, and transforms the linear laser light transformed to be telecentric by the entrance surface, into planar laser light by reflecting the laser light using the plurality of reflection surfaces.

According to this configuration, the laser light from the laser light source is transformed into linear laser light by the free-form surface mirror that diffuse-reflects the light. The linear laser light transformed by the free-form surface mirror enters the entrance surface of the light guiding plate in which the transformation optical system, for transforming the laser light to be telecentric, is formed. The linear laser light transformed to be telecentric by the entrance surface is transformed into the planar laser light by the planar reflection surface adjacent to the entrance surface. The planar laser light transformed by the planar reflection surface is emitted from the emission surface.

Therefore the light quantity loss of the laser light can be limited to the surface reflection on the free-form surface mirror, surface reflection on the entrance surface of the light guiding plate and emission surface of the light guiding plate, and absorption in the light guiding plate. Instead of reflecting the laser light by a plurality of half mirrors, the linear laser light is reflected by the planar reflection surface, so brightness can be uniform.

In the above mentioned liquid crystal display backlight device, it is preferable that the light guiding unit includes: a free-form surface mirror that transforms the laser light from the laser light source into linear laser light by diffuse-reflecting the laser light; a transformation optical system that transforms the linear laser light transformed by the free-form surface mirror, to be telecentric; and a light guiding plate that has an entrance surface where the linear laser light transformed to be telecentric by the transformation optical system enters, the planar reflection surface, and an emission surface that emits the planar laser light transformed by the planar reflection surface, and the planar reflection surface is adjacent to the entrance surface, and transforms the linear laser light which entered from the entrance surface into planar laser light by reflecting the laser light using the plurality of reflection surfaces.

According to this configuration, the laser light from the laser light source is transformed into the linear laser light by the free-form surface mirror that diffuse-reflects the light. The linear laser light transformed by the free-form surface mirror is transformed to be telecentric by the transformation optical system. The linear laser light transformed to be telecentric by the transformation optical system enters the entrance surface of the light guiding plate. The linear laser light entered from the entrance surface is transformed into planar laser light by the planar reflection surface adjacent to the entrance surface. The planar laser light transformed by the planar reflection surface is emitted from the emission surface.

Therefore the light quantity loss of the laser light can be limited to the surface reflection on the free-form mirror, surface reflection on the entrance surface of the transformation optical system and the emission surface of the transformation optical system, absorption in the transformation optical system, surface reflection on the entrance surface of the light guiding plate and emission surface of the light guiding plate, and absorption in the light guiding plate. Instead of reflecting the laser light by a plurality of half mirrors, the linear laser light is reflected by the planar reflection surface, so brightness can be uniform.

In the above mentioned liquid crystal display backlight device, it is preferable that the light guiding plate includes: an emission surface that faces the planar reflection surface and emits the planar laser light transformed by the planar reflection surface; and a reflection surface that reflects the entered linear laser light toward the planar reflection surface or the emission surface. According to this configuration, the reflection surface for reflecting the entered linear laser light toward the planar reflection surface or emission surface is disposed in the light guiding plate, whereby the light guiding plate can be easily molded, and can be manufactured at low cost.

In the above mentioned liquid crystal display backlight device, it is preferable that the laser light that enters the light guiding plate vibrate in a direction vertical to the optical axis. According to this configuration, the laser light which entered the entrance surface of the light guiding plate vibrates in a direction vertical to the optical axis, so the speckle noise can be decreased and good image quality can be easily implemented. Even if the diameter and emission angle of the laser light source disperses or fluctuates, uniformity of a profile of the two-dimensionally transformed laser light is influenced less.

In the above mentioned liquid crystal display backlight device, it is preferable that the planar reflection surface includes a triangular prism array or trapezoidal prism array, and a sequence of points connecting at least one vertex of vertexes of each triangular prism or each trapezoidal prism of the triangular prism array or the trapezoidal prism array is expressed by a polynomial of degree 2 or more.

According to this configuration, a sequence of points connecting at least one vertex of vertexes of each triangular prism or each trapezoidal prism of the triangular prism array or trapezoidal prism array is expressed by a polynomial of degree 2 or more, so the cross-section of the planar reflection surface becomes not a straight line, but a curved line, and the profile of the laser light can be uniform, and brightness can be uniform.

In the above mentioned liquid crystal display backlight device, it is preferable that the light guiding plate further has an emission surface that faces the planar reflection surface and emits the planar laser light transformed by the planar reflection surface, and the pitch of the triangular prism array or trapezoidal prism array including the planar reflection surface is $(0.01 \times L1/L2)$ mm or more, where L1 denotes a length of the planar reflection surface in a propagation direction of the laser light that enter the planar reflection surface, and L2 denotes a length between the planar reflection surface and the emission surface.

According to this configuration, the pitch of the triangular prism array or trapezoidal prism array including the planar reflection surface is set to $(0.01 \times L1/L2)$ mm or more, therefore the area where the laser light can be reflected vertically in each triangular prism or trapezoidal prism can be expanded, and light utilization efficiency can be improved.

It is preferable that the above mentioned liquid crystal display backlight device further has at least two diffusion plates that are disposed near the emission surface of the light guiding plate, characterized in that the distance between a first diffusion plate that is closest to the light guiding plate and a second diffusion plate that is closest to the light guiding plate next to the first diffusion plate is $\{(0.01 \times L1/L2)/\tan \alpha\}$ mm or more, where a denotes a diffusion angle of the first diffusion plate.

According to this configuration, at least two diffusion plates are disposed near the emission surface of the light guiding plate. And the distance between the first diffusion plate that is closest to the light guiding plate and the second diffusion plate that is closest to the light guiding plate next to the first diffusion plate is $\{(0.01 \times L1/L2)/\tan \alpha\}$ mm or more, so the laser light reflected by each triangular prism or trapezoidal prism can be overlapped with certainty, and a better image can be acquired.

In the above mentioned liquid crystal display backlight device, it is preferable that the linear reflection surface includes a triangular prism array or trapezoidal prism array, and a sequence of points connecting at least one vertex of the vertexes of each triangular prism or each trapezoidal prism of the triangular prism array or the trapezoidal prism array is expressed by a polynomial of degree 2 or more.

According to this configuration, a sequence of points connecting at least one vertex of the vertexes of each triangular prism or each trapezoidal prism of the triangular prism array or trapezoidal prism array is expressed by a polynomial of degree 2 or more, so the cross-section of the linear reflection surface is not a straight line, but a curve, which makes the profile of the laser light uniform, and brightness uniform.

In the above mentioned liquid crystal display backlight device, it is preferable that the pitch of the triangular prism array or trapezoidal prism array including the linear reflection surface is $(0.01 \times L3/D)$ mm or more, where L3 denotes a length of the linear reflection surface in the longitudinal direction, and D denotes a diameter of the laser light that enters the entrance surface.

According to this configuration, the pitch of the triangular prism array or trapezoidal prism array constituting the linear reflection surface is set to $(0.01 \times L3/D)$ mm or more, whereby the area where the laser light is reflected vertically in each triangular prism or trapezoidal prism can be expanded, and the light utilization efficiency can be improved.

It is preferable that the above mentioned liquid crystal display backlight device further has at least two diffusion plates that are disposed near the emission surface of the light guiding plate, and the distance between a first diffusion plate that is closest to the light guiding plate and a second diffusion plate that is closest to the light guiding plate next to the first diffusion plate is $\{(0.01 \times L3/D)/\tan \alpha\}$ mm or more, where a denotes a diffusion angle of the first diffusion plate.

According to this configuration, at least two diffusion plates are disposed near the emission surface of the light guiding plate. By setting the distance between the first diffusion plate that is closest to the light guiding plate and the second diffusion plate that is closest to the light guiding plate next to the first diffusion plate to be $\{(0.01 \times L3/D)/\tan\alpha\}$ mm or more, the laser light reflected by each triangular prism or trapezoidal prism can be overlapped with certainty, and an even better image can be obtained.

In the above mentioned liquid crystal display backlight device, it is preferable that at least one of the two diffusion plates vibrates in the plane of the diffusion plate(s). According to this configuration, the laser light emitted from the diffusion plate vibrates in a direction vertical to the optical axis, so the speckle noise is decreased, and a good image can be easily obtained.

In the above mentioned liquid crystal display backlight device, it is preferable that the light guiding bar further has a reflection surface for reflecting laser light that entered from the entrance surface toward the linear reflection surface or the emission surface.

According to this configuration, the reflection surface for reflecting the entered laser light toward the linear reflection surface or emission surface is disposed in the light guiding bar, so the light guiding bar can be molded easily, and can be manufactured with low cost.

In the above mentioned liquid crystal display backlight, it is preferable that the linear reflection surface includes a triangular prism array or trapezoidal prism array, and the pitch of the triangular prism array or trapezoidal prism array including the linear reflection surface is $(0.01 \times L3/W1)$ mm or more, where L3 denotes a length of the linear reflection surface in the longitudinal direction, and W1 denotes a width of the entrance surface of the light guiding bar in the laser light propagation surface.

According to this configuration, the pitch of the triangular prism array or trapezoidal prism array including the linear reflection surface is set to $(0.01 \times L3/W1)$ mm or more, whereby the area where the laser light reflects vertically in each triangular prism or each trapezoidal prism can be expanded, and light utilization efficiency can be improved.

In the above mentioned liquid crystal display backlight device, it is preferable that the light guiding bar vibrates in the longitudinal direction with an amplitude of $(0.01 \times L3/W1)$ mm or more. According to this configuration, a micro area having a width the same as the pitch of the triangular prism array or trapezoidal prism array is scanned horizontally, so the sparkle noise can be decreased, and a good image quality can be easily obtained.

It is preferable that the above mentioned liquid crystal display backlight device further has at least two diffusion plates that are disposed near the emission surface of the light guiding plate, and the distance between a first diffusion plate that is closest to the light guiding plate and a second diffusion plate that is closest to the light guiding plate next to the first diffusion plate is $\{(0.01 \times L3/W1)/\tan\alpha\}$ mm or more, where a denotes a diffusion angle of the first diffusion plate.

According to this configuration, at least two diffusion plates are disposed near the emission surface of the light guiding plate. And the distance between the first diffusion plate that is closest to the light guiding plate and the second diffusion plate that is closest to the light guiding plate next to the first diffusion plate is $\{(0.01 \times L3/W1)/\tan\alpha\}$ mm or more, so the laser light reflected by each triangular prism or trapezoidal prism can be overlapped with certainty, and a better image can be acquired.

In the above mentioned liquid crystal display backlight device, it is preferable that the light guiding plate further has an emission surface that emits the planar laser light transformed by the planar reflection surface, and one of the emission surface of the light guiding bar and the entrance surface of the light guiding plate includes a cylindrical lens array.

According to this configuration, the laser light is expanded by the cylindrical lens array, so the number of diffusion plates to be disposed near the emission surface of the light guiding plate can be decreased, and the light utilization efficiency can be improved.

In the above mentioned liquid crystal display backlight device, it is preferable that the emission surface of the light guiding plate includes a cylindrical lens array or spherical lens array.

According to this configuration, the laser light is expanded by the cylindrical lens array or spherical lens array, so the number of diffusion plates to be disposed near the emission surface of the light guiding plate can be decreased, and the light utilization efficiency can be improved.

In the above mentioned liquid crystal display backlight device, it is preferable that the reflection surface of the free-form surface mirror is expressed by a polynomial of degree 8 or more. According to this configuration, the reflection surface of the free-form surface mirror is expressed by a polynomial of degree 8 or more, so the profile of the laser light can be uniform, and brightness can be uniform.

In the above mentioned liquid crystal display backlight device, it is preferable that the free-form surface mirror vibrates in a direction vertical to the optical axis direction of the laser light that enters the free-form surface mirror. According to this configuration, the laser light that enters the light guiding plates vibrate in a direction vertical to the optical axis, so the speckle noise can be decreased, and good image quality can be easily obtained.

In the above mentioned liquid crystal display backlight device, it is preferable that the transformation optical system includes a triangular prism array. According to this configuration, the distance between the free-form surface mirror and the transformation optical system can be decreased, and the liquid crystal display backlight device can be downsized.

In the above mentioned liquid crystal display backlight device, it is preferable that the transformation optical system includes a composite of a triangular prism array and a Fresnel lens. According to this configuration, the distance between the free-form surface mirror and the transformation optical system can be further decreased, and further downsizing of the liquid crystal display backlight device can be implemented.

In the above mentioned liquid crystal display backlight device, it is preferable that the pitch of the triangular prism array including the transformation optical system is $(0.1 \times L4/L5)$ mm or more, where L4 denotes a length of the entrance surface of the light guiding plate in the longitudinal direction, and L5 denotes a distance from the free-form surface mirror to the transformation optical system.

According to this configuration, the pitch of the triangular prism array including the transformation optical system is set to $(0.1 \times L4/L5)$ mm or more, whereby the area where the laser light is reflected vertically in each triangular prism can be expanded, and the light utilization efficiency can be improved.

In the above mentioned liquid crystal display backlight device, it is preferable that the transformation optical system vibrates in the longitudinal direction of the transformation optical system.

According to this configuration, the laser light emitted from the light guiding plate vibrates in a direction vertical to the optical axis by vibrating the transformation optical system in the longitudinal direction, so the speckle noise is decreased, and a good image can be easily obtained.

In the above mentioned liquid crystal display backlight device, it is preferable that the transformation optical system vibrates in a one-dimensional longitudinal direction of the transformation optical system with a (0.1×L4/L5) mm or more amplitude, where L4 denotes a length of the entrance surface of the light guiding plate in the longitudinal direction, and L5 denotes a distance from the free-form surface mirror to the transformation optical system.

According to this configuration, a micro area having a width the same as the pitch of the triangular prism array is scanned horizontally, so the speckle noise can be decreased, and good image quality can be easily obtained.

In the above mentioned liquid crystal display backlight device, it is preferable that at least two diffusion plates that are disposed near the emission surface of the light guiding plate, and the distance between a first diffusion plate that is closest to the light guiding plate and a second diffusion plate that is closest to the light guiding plate next to the first diffusion plate is $\{(0.01 \times L4/L5) \tan \alpha\}$ mm or more, where $\alpha$ denotes a diffusion angle of the first diffusion plate.

According to this configuration, at least two diffusion plates are disposed near the emission surface of the light guiding plate. And the distance between the first diffusion plate that is closest to the light guiding plate and the second diffusion plate that is closest to the light guiding plate next to the first diffusion plate is $\{(0.01 \times L4/L5)/\tan \alpha\}$ mm or more, so the laser light reflected by each triangular prism can be overlapped with certainty, and a better image can be acquired.

In the above mentioned liquid crystal display backlight device, it is preferable that the entrance surface of the light guiding plate includes a cylindrical lens array.

According to this configuration, the laser light is expanded by the cylindrical lens array, and the number of diffusion plates to be disposed near the emission surface of the light guiding plate can be decreased, and the light utilization efficiency can be improved.

In the above mentioned liquid crystal display backlight device, it is preferable that the laser light emitted from the laser light source is transformed into approximately parallel light before being transformed into linear laser light. According to this configuration, the light quantity loss in the light guide plate can be decreased, and the liquid crystal display backlight device can be downsized.

In the above mentioned liquid crystal display backlight device, it is preferable that the laser light emitted from the laser light source is aligned in the polarizing directions before being transformed into linear laser light. According to this configuration, laser light aligned in the polarizing directions is used, so light quantity loss can be minimized, and the light utilization efficiency can be improved.

In the above mentioned liquid crystal display backlight device, it is preferable that the laser light source includes a fiber light source. According to this configuration, the laser light from the light source is guided by the fiber, so the light source can be disposed away from the display, and the display can be downsized.

A liquid crystal display according to another aspect of the present invention has the liquid crystal display backlight device according to one of the above, and a two-dimensional spatial modulation element that two-dimensionally modulates the light intensity of light irradiated by the liquid crystal display backlight device.

According to this configuration, the entered linear laser light is transformed into planar laser light by being reflected using the planar reflection surface disposed in the light guiding plate, so a liquid crystal display that can suppress the light quantity loss and can make brightness uniform can be provided.

INDUSTRIAL APPLICABILITY

The LCD backlight device and liquid crystal display according to the present invention can implement a liquid crystal display which can suppress light quantity loss and can make brightness uniform, and is particularly useful for an LCD backlight device that uses three color light sources: R (red), G (green) and B (blue), and a liquid crystal display using this LCD backlight. The LCD backlight device and liquid crystal display according to the present invention can be used for liquid crystal TVs and related products.

The invention claimed is:

1. A liquid crystal display backlight device, comprising:
   a laser light source that emits laser light; and
   a light guiding unit that transforms the laser light from the laser light source into a linear laser light by substantially vertical reflection, and transforms the linear laser light into a planar laser light, and emits the planar laser light, wherein
   the laser light enters into the light guiding unit as substantially parallel light,
   the light guiding unit includes a light guiding plate that has a planar reflection surface for transforming the linear laser light into the planar laser light by reflecting substantially vertically the linear laser light by a plurality of reflection surfaces that are formed along an entrance direction of the linear laser light, and
   the planar reflection surface includes a triangular prism array or trapezoidal prism array, and a sequence of points connecting at least one vertex of vertexes of each triangular prism or each trapezoidal prism of the triangular prism array or the trapezoidal prism array is expressed by a polynomial of degree 2 or more.

2. The liquid crystal display backlight device according to claim 1, wherein
   the light guiding plate has an entrance surface where the laser light enters, a linear reflection surface that is adjacent to the entrance surface and transforms the laser light into linear laser light by reflecting the laser light which has entered from the entrance surface, the planar reflection surface, and an emission surface that emits the planar laser light transformed by the planar reflection surface, and
   the planar reflection surface is adjacent to the entrance surface and the linear reflection surface, and transforms the linear laser light into planar laser light by reflecting the linear laser light transformed by the linear reflection surface, using the plurality of reflection surfaces.

3. The liquid crystal display backlight device according to claim 2, wherein
   the linear reflection surface includes a triangular prism array or trapezoidal prism array, and a sequence of points connecting at least one vertex of vertexes of each triangular prism or each trapezoidal prism of the triangular prism array or the trapezoidal prism array is expressed by a polynomial of degree 2 or more.

4. The liquid crystal display backlight device according to claim 3, wherein
   the pitch of the triangular prism array or trapezoidal prism array including the linear reflection surface is (0.01×L3/D) mm or more, where L3 denotes a length of the linear reflection surface in the longitudinal direction, and D denotes a diameter of the laser light that enters the entrance surface.

5. The liquid crystal display backlight device according to claim 4, further comprising
at least two diffusion plates that are disposed near the emission surface of the light guiding plate, wherein
the distance between a first diffusion plate that is closest to the light guiding plate and a second diffusion plate that is closest to the light guiding plate next to the first diffusion plate is $\{(0.01 \times L3/D)/\tan \alpha\}$ mm or more, where $\alpha$ denotes a diffusion angle of the first diffusion plate.

6. The liquid crystal display backlight according to claim 1, wherein
the light guiding unit further comprises:
a light guiding bar that has an entrance surface where the laser light from the laser light source enters, a linear reflection surface that is adjacent to the entrance surface and transforms the laser light which has entered from the entrance surface into linear laser light by reflecting the laser light, and an emission surface that is adjacent to the entrance surface and faces the linear reflection surface, and emits the linear laser light transformed by the linear reflection surface,
wherein the light guiding plate has an entrance surface where the linear laser light emitted from the emission surface of the light guiding bar enters, the planar reflection surface, and an emission surface that emits the planar laser light transformed by the planar reflection surface, and
the planar reflection surface is adjacent to the entrance surface, and transforms the linear laser light which has entered from the entrance surface into planar laser light by reflecting the linear laser light using the plurality of reflection surfaces.

7. The liquid crystal display backlight device according to claim 6, wherein
the light guiding bar further has a reflection surface for reflecting laser light that entered from the entrance surface toward the linear reflection surface or the emission surface.

8. The liquid crystal display backlight device according to claim 6, wherein
the linear reflection surface includes a triangular prism array or trapezoidal prism array, and
the pitch of the triangular prism array or trapezoidal prism array including the linear reflection surface is $(0.01 \times L3/W1)$ mm or more, where L3 denotes a length of the linear reflection surface in the longitudinal direction, and W1 denotes a width of the entrance surface of the light guiding bar in the laser light propagation surface.

9. The liquid crystal display backlight device according to claim 8, wherein
the light guiding bar vibrates in the longitudinal direction with an amplitude of $(0.01 \times L3/W1)$ mm or more.

10. The liquid crystal display backlight device according to claim 8, further comprising
at least two diffusion plates that are disposed near the emission surface of the light guiding plate, wherein
the distance between a first diffusion plate that is closest to the light guiding plate and a second diffusion plate that is closest to the light guiding plate next to the first diffusion plate is $\{(0.01 \times L3/W1)/\tan \alpha\}$ mm or more, where $\alpha$ denotes a diffusion angle of the first diffusion plate.

11. The liquid crystal display backlight device according to claim 6, wherein one of the emission surface of the light guiding bar and the entrance surface of the light guiding plate includes a cylindrical lens array.

12. The liquid crystal display backlight device according to claim 1, wherein
the light guiding plate further comprises:
an emission surface that faces the planar reflection surface and emits the planar laser light transformed by the planar reflection surface; and
a reflection surface that reflects the entered linear laser light toward the planar reflection surface or the emission surface.

13. The liquid crystal display backlight device according to claim 1, wherein
the laser light that enters the light guiding plate vibrates in a direction vertical to the optical axis.

14. The liquid crystal display backlight device according to claim 1, wherein
the light guiding plate further has an emission surface that faces the planar reflection surface and emits the planar laser light transformed by the planar reflection surface, and
the pitch of the triangular prism array or trapezoidal prism array including the planar reflection surface is $(0.01 \times L1/L2)$ mm or more, where L1 denotes a length of the planar reflection surface in a propagation direction of the laser light that enters the planar reflection surface, and L2 is a length between the planar reflection surface and the emission surface.

15. The liquid crystal display backlight device according to claim 14, further comprising
at least two diffusion plates that are disposed near the emission surface of the light guiding plate, wherein
the distance between a first diffusion plate that is closest to the light guiding plate and a second diffusion plate that is closest to the light guiding plate next to the first diffusion plate is $\{(0.01 \times L1/L2)/\tan \alpha\}$ mm or more, where $\alpha$ denotes a diffusion angle of the first diffusion plate.

16. The liquid crystal display backlight device according to claim 15, wherein
at least one of the two diffusion plates vibrates in the plane of the diffusion plates.

17. A liquid crystal display, comprising:
the liquid crystal display backlight device according to claim 1; and
a two-dimensional spatial modulation element that two-dimensionally modulates the light intensity of light irradiated by the liquid crystal display backlight device.

18. A liquid crystal display backlight device, comprising:
a laser light source that emits laser light; and
a light guiding unit that transforms the laser light from the laser light source into a linear laser light, and transforms the linear laser light into a planar laser light, and emits the planar laser light, wherein
the laser light enters into the light guiding unit as substantially parallel light,
the light guiding unit includes a light guiding plate that has a planar reflection surface for transforming the linear laser light into the planar laser light by reflecting substantially vertically the linear laser light by a plurality of reflection surfaces that are formed along an entrance direction of the linear laser light,
wherein the light guiding unit further comprises a free-form surface mirror that transforms the laser light from the laser light source into linear laser light by diffuse-reflecting the laser light, wherein the light guiding plate has an entrance surface on which a transformation optical system, by which the linear laser light transformed by the free-form surface mirror enters, and the entered linear laser light is transformed to be telecentric, is formed, the planar reflection surface, and an emission surface that emits the planar laser light transformed by the planar reflection surface, and the planar reflection surface is adjacent to the entrance surface, and transforms the linear laser light transformed to be telecentric by the entrance surface, into planar laser light by reflecting the linear laser light using the plurality of reflection surfaces.

19. The liquid crystal display backlight device according to claim 18, wherein
the reflection surface of the free-form surface mirror is expressed by a polynomial of degree 8 or more.

20. The liquid crystal display backlight device according to claim 18, wherein
the free-form surface mirror vibrates in a direction vertical to the optical axis direction of the laser light that enters the free-form surface mirror.

21. The liquid crystal display backlight device according to claim 18, wherein
the transformation optical system includes a triangular prism array.

22. The liquid crystal display backlight device according to claim 18, wherein
the transformation optical system includes a composite of a triangular prism array and a Fresnel lens.

23. The liquid crystal display backlight device according to claim 22, wherein
the pitch of the triangular prism array including the transformation optical system is (0.1×L4/L5) mm or more, where L4 denotes a length of the entrance surface of the light guiding plate in the longitudinal direction, and L5 denotes a distance from the free-form surface mirror to the transformation optical system.

24. A liquid crystal display backlight device, comprising:
a laser light source that emits laser light; and
a light guiding unit that transforms the laser light from the laser light source into a linear laser light, and transforms the linear laser light into a planar laser light, and emits the planar laser light, wherein
the laser light enters into the light guiding unit as substantially parallel light,
the light guiding unit includes a light guiding plate that has a planar reflection surface for transforming the linear laser light into the planar laser light by reflecting substantially vertically the linear laser light by a plurality of reflection surfaces that are formed along an entrance direction of the linear laser light, wherein the light guiding unit further comprises:
a free-form surface mirror that transforms the laser light from the laser light source into linear laser light by diffuse-reflecting the laser light; and
a transformation optical system that transforms the linear laser light transformed by the free-form surface mirror, to be telecentric,
wherein the light guiding plate has an entrance surface where the linear laser light transformed to be telecentric by the transformation optical system enters, the planar reflection surface, and an emission surface that emits the planar laser light transformed by the planar reflection surface, and
the planar reflection surface is adjacent to the entrance surface, and transforms the linear laser light which have entered from the entrance surface into planar laser light by reflecting the linear laser light using the plurality of reflection surfaces.

25. The liquid crystal display backlight device according to claim 24, wherein
the transformation optical system vibrates in the longitudinal direction of the transformation optical system.

26. The liquid crystal display backlight device according to claim 25, wherein
the transformation optical system vibrates in a one-dimensional longitudinal direction of the transformation optical system with a (0.1×L4/L5) mm or more amplitude, where L4 denotes a length of the entrance surface of the light guiding plate in the longitudinal direction, and L5 denotes a distance from the free-form surface mirror to the transformation optical system.

27. The liquid crystal display backlight device according to claim 25, further comprising
at least two diffusion plates that are disposed near the emission surface of the light guiding plate, wherein
the distance between a first diffusion plate that is closest to the light guiding plate and a second diffusion plate that is closest to the light guiding plate next to the first diffusion plate is {(0.01×L4/L5) tan α} mm or more, where a denotes a diffusion angle of the first diffusion plate.

28. The liquid crystal display backlight device according to claim 24, wherein
the entrance surface of the light guiding plate includes a cylindrical lens array.

29. The liquid crystal display backlight device according to claim 1, wherein
the light guiding plate further has an emission surface that emits the planar laser light transformed by the planar reflection surface, and
the emission surface of the light guiding plate includes a cylindrical lens array or spherical lens array.

* * * * *

UNITED STATES PATENT AND TRADEMARK OFFICE
CERTIFICATE OF CORRECTION

PATENT NO.        : 8,416,363 B2
APPLICATION NO.   : 12/669297
DATED             : April 9, 2013
INVENTOR(S)       : Shikii et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 541 days.

Signed and Sealed this
Fifteenth Day of October, 2013

Teresa Stanek Rea
*Deputy Director of the United States Patent and Trademark Office*